(12) United States Patent
Campbell et al.

(10) Patent No.: US 8,160,365 B2
(45) Date of Patent: Apr. 17, 2012

(54) METHODS AND SYSTEMS FOR IDENTIFYING DIGITAL IMAGE CHARACTERISTICS

(75) Inventors: Richard John Campbell, Camas, WA (US); Jon M. Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 826 days.

(21) Appl. No.: 12/164,985

(22) Filed: Jun. 30, 2008

(65) Prior Publication Data

US 2009/0324083 A1     Dec. 31, 2009

(51) Int. Cl.
*G06K 9/46*     (2006.01)
(52) U.S. Cl. ........................................ 382/190
(58) Field of Classification Search .......... 382/182, 382/185–187, 190, 203, 228
See application file for complete search history.

(56) References Cited

U.S. PATENT DOCUMENTS

| | | |
|---|---|---|
| 5,020,117 A | 5/1991 | Ooi et al. |
| 5,031,225 A | 7/1991 | Tachikawa et al. |
| 5,060,276 A | 10/1991 | Morris et al. |
| 5,077,811 A | 12/1991 | Onda |
| 5,168,147 A | 12/1992 | Bloomberg |
| 5,191,438 A | 3/1993 | Katsurada et al. |
| 5,235,651 A | 8/1993 | Nafarieh |
| 5,245,165 A | 9/1993 | Zhang |
| 5,251,268 A | 10/1993 | Colley et al. |
| 5,276,742 A | 1/1994 | Dasari et al. |
| 5,319,722 A | 6/1994 | Oki et al. |
| 5,375,176 A | 12/1994 | Spitz |
| 5,425,110 A | 6/1995 | Spitz |
| 5,444,797 A | 8/1995 | Spitz et al. |
| 5,471,549 A | 11/1995 | Kurosu et al. |
| 5,508,810 A | 4/1996 | Sato |
| 5,664,027 A | 9/1997 | Ittner |
| 5,689,585 A | 11/1997 | Bloomberg et al. |
| 5,710,865 A | 1/1998 | Abe |
| 5,828,771 A | 10/1998 | Bloomberg |
| 5,835,632 A | 11/1998 | Takasu et al. |
| 5,889,884 A | 3/1999 | Hashimoto et al. |
| 5,911,005 A | 6/1999 | Uchiyama |
| 5,930,001 A | 7/1999 | Satoh et al. |
| 5,982,929 A | 11/1999 | Ilan et al. |
| 5,987,171 A | 11/1999 | Wang |
| 6,011,877 A | 1/2000 | Ishikawa et al. |
| 6,064,767 A | 5/2000 | Muir et al. |
| 6,101,270 A | 8/2000 | Takahashi |
| 6,104,832 A | 8/2000 | Saito et al. |

(Continued)

FOREIGN PATENT DOCUMENTS

EP     1073001 A2     1/2001

(Continued)

OTHER PUBLICATIONS

A. Lawrence Spitz, "Determination of the Script and Language Content of Document Images," IEEE Transactions on Pattern Analysis and Machine Intelligence, Mar. 1997, pp. 235-245, vol. 19, No. 3, IEEE, USA.

(Continued)

*Primary Examiner* — Daniel Mariam
(74) *Attorney, Agent, or Firm* — Kristine Elizabeth Matthews; David C. Ripma

(57) ABSTRACT

Aspects of the present invention relate to methods and systems for determining image characteristics in a digital image.

23 Claims, 11 Drawing Sheets

U.S. PATENT DOCUMENTS

| | | |
|---|---|---|
| 6,125,362 A | 9/2000 | Elworthy |
| 6,137,905 A | 10/2000 | Takaoka |
| 6,151,423 A | 11/2000 | Melen |
| 6,167,369 A | 12/2000 | Schulze |
| 6,169,822 B1 | 1/2001 | Jung |
| 6,173,088 B1 | 1/2001 | Koh et al. |
| 6,256,398 B1 | 7/2001 | Chang |
| 6,266,441 B1 | 7/2001 | Hashimoto et al. |
| 6,304,681 B1 | 10/2001 | Akiba et al. |
| 6,320,983 B1 | 11/2001 | Matsuno et al. |
| 6,360,028 B1 | 3/2002 | Kaji et al. |
| 6,411,743 B1 | 6/2002 | Koh et al. |
| 6,501,864 B1 | 12/2002 | Eguchi et al. |
| 6,574,375 B1 | 6/2003 | Cullen et al. |
| 6,624,905 B1 | 9/2003 | Ikegami et al. |
| 6,704,698 B1 | 3/2004 | Paulsen, Jr. et al. |
| 6,714,677 B1 | 3/2004 | Stearns et al. |
| 6,798,905 B1 | 9/2004 | Sugiura et al. |
| 6,804,414 B1 | 10/2004 | Sakai et al. |
| 6,941,030 B2 | 9/2005 | Kakutani et al. |
| 6,993,205 B1 | 1/2006 | Lorie et al. |
| 7,031,553 B2 | 4/2006 | Myers et al. |
| 7,151,860 B1 | 12/2006 | Sakai et al. |
| 7,305,619 B2 * | 12/2007 | Kaneda et al. ............. 715/273 |
| 7,379,603 B2 | 5/2008 | Ross et al. |
| 7,567,730 B2 * | 7/2009 | Ohguro ............. 382/290 |
| 7,580,571 B2 | 8/2009 | Ohguro |
| 2001/0013938 A1 | 8/2001 | Usami et al. |
| 2001/0028737 A1 | 10/2001 | Takakura et al. |
| 2003/0049062 A1 | 3/2003 | Machida |
| 2003/0086721 A1 | 5/2003 | Guillemin et al. |
| 2003/0152289 A1 | 8/2003 | Lou |
| 2003/0210437 A1 | 11/2003 | Machida |
| 2004/0001606 A1 | 1/2004 | Levy |
| 2004/0179733 A1 | 9/2004 | Okubo |
| 2004/0218836 A1 | 11/2004 | Kanatsu |
| 2005/0041865 A1 | 2/2005 | Zhen et al. |
| 2005/0163399 A1 | 7/2005 | Aradhye |
| 2006/0018544 A1 | 1/2006 | Ohguro |
| 2006/0033967 A1 | 2/2006 | Brunner |
| 2006/0204110 A1 | 9/2006 | Steinberg et al. |
| 2006/0210195 A1 | 9/2006 | Ohguro |
| 2006/0215230 A1 | 9/2006 | Borrey et al. |
| 2006/0287848 A1 | 12/2006 | Li et al. |

FOREIGN PATENT DOCUMENTS

| | | |
|---|---|---|
| GB | 2383223 A | 6/2003 |
| JP | 62-224870 A | 10/1987 |
| JP | 06-131496 A | 5/1994 |
| JP | 07-065120 A | 3/1995 |
| JP | 10-224595 A | 8/1998 |
| JP | 11-195087 A | 7/1999 |
| JP | 2005-063419 A | 3/2005 |
| JP | 2005-346607 A | 12/2005 |

OTHER PUBLICATIONS

Japanese Office Action—Patent Application No. 2008-179231—Mailing Date Aug. 17, 2010.

USPTO Office Action—U.S. Appl. No. 11/775,773—Notification Date Nov. 26, 2010.

Wang, Haralick and Phillips, "Zone Content Classification and Its Performance Evaluation," Sixth International Conference on Document Analysis and Recognition, 2001, pp. 540-544, Seattle, Washington, USA.

Japanese Office Action—Application No. 2009-139107—Mailing Date May 31, 2011.

USPTO Office Action—U.S. Appl. No. 11/775,773—Mailing Date Aug. 5, 2011.

* cited by examiner

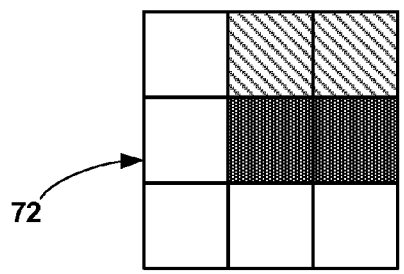
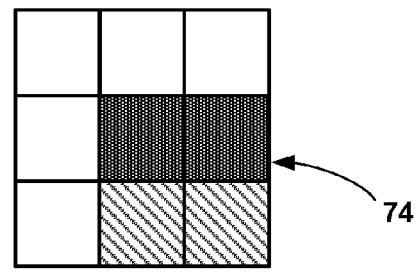
FIG. 6D
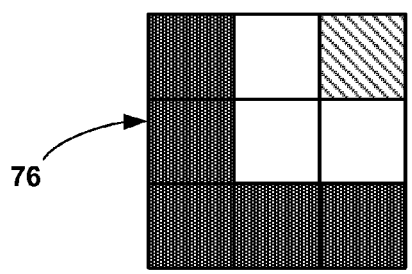
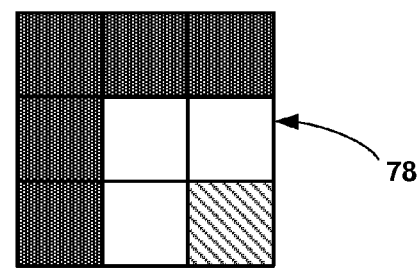
FIG. 6E               FIG. 6F
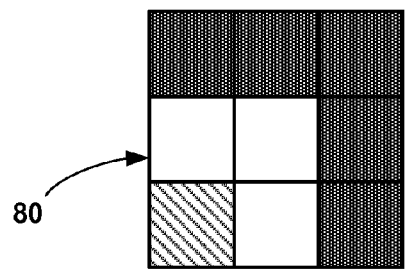
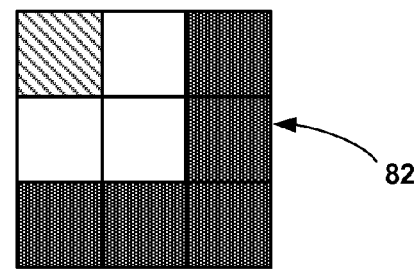
FIG. 6G               FIG. 6H

METHODS AND SYSTEMS FOR IDENTIFYING DIGITAL IMAGE CHARACTERISTICS

FIELD OF THE INVENTION

Embodiments of the present invention comprise methods and systems for determining digital image characteristics, in particular, document orientation and language family.

BACKGROUND

Page orientation in an electronic document may not correspond to page orientation in the original document, referred to as the nominal page orientation, due to factors which may comprise scan direction, orientation of the original document on the imaging device platen and other factors. The discrepancy between the page orientation in the electronic document and the nominal page orientation may lead to an undesirable, an unexpected, a less than optimal or an otherwise unsatisfactory outcome when processing the electronic document. For example, the difference in orientation may result in an undesirable outcome when a finishing operation is applied to a printed version of the electronic document. Exemplary finishing operations may comprise binding, stapling and other operations. Furthermore, in order to perform at an acceptable level of accuracy, some image processing operations, for example, optical character recognition (OCR), may require input data of a specific orientation. Additionally, if the page orientation of an electronic document is unknown relative to the nominal page orientation, proper orientation for display on a viewing device, for example, a computer monitor, hand-held display and other display devices, may not be achieved.

SUMMARY

Some embodiments of the present invention comprise methods and systems for determining page orientation in a digital image using a measure of the distribution of glyph features. Other embodiments of the present invention comprise methods and systems for determining the language or language family of the text in an electronic document using a measure of the distribution of glyph features. Some embodiments of the present invention comprise methods and systems for jointly determining page orientation and language or language family in an electronic document using a measure of the distribution of glyph features. Some embodiments of the present invention comprise methods and systems which may use supervised training methods to build a prototypical distribution of glyph features over a page or a text region from a set of training data samples. Alternative embodiments of the present invention comprise methods and systems which may use a statistical framework, wherein given a set of glyph-feature distribution values, the language family or orientation of the input page, or region, may be identified.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 6D is a drawing showing exemplary pixel patterns corresponding to a glyph feature which may be referred to as "leftward pointing;"

FIG. 6E is a drawing showing an exemplary pixel pattern corresponding to a glyph feature which may be referred to as "up-right open;"

FIG. 6F is a drawing showing an exemplary pixel pattern corresponding to a glyph feature which may be referred to as "down-right open;"

FIG. 6G is a drawing showing an exemplary pixel pattern corresponding to a glyph feature which may be referred to as "down-left open;"

FIG. 6H is a drawing showing an exemplary pixel pattern corresponding to a glyph feature which may be referred to as "up-left open;"

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Page orientation in an electronic document, also considered a document image, text image or image, may not correspond to page orientation in the original document, referred to as the nominal page orientation, due to factors which may comprise scan direction, orientation of the original document on the scanner platen and other factors. The discrepancy between the page orientation in the electronic document and the nominal page orientation may lead to an undesirable, an unexpected, a less than optimal or an otherwise unsatisfactory outcome when processing the electronic document. For example, the difference in orientation may result in an undesirable outcome when a finishing operation is applied to a printed version of the electronic document. Exemplary finishing operations may comprise binding, stapling and other operations. Furthermore, in order to perform at an acceptable level of accuracy, some image processing operations, for example, optical character recognition (OCR), may require input data in a specific orientation. Additionally, if the page orientation of an electronic document is unknown relative to the nominal page orientation, proper orientation for display on a viewing device, for example, a computer monitor, handheld display and other display devices, may not be achieved.

Some embodiments of the present invention relate to automatic detection of a dominant text orientation in an electronic document. Text orientation may be related to the nominal page orientation.

During scanning, copying and other digital imaging processes, a document may be placed on the platen or in the document feeder of an imaging device in a non-standard orientation such that the electronic reproduction, also considered the scan, may be flipped or rotated from the normal, reading orientation.

Figure 1A:
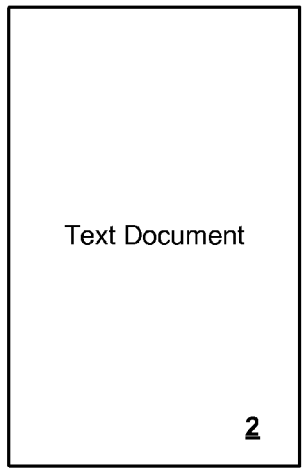
FIG. 1A is a drawing showing an exemplary text document in a "readable" orientation.
Figure 1B:
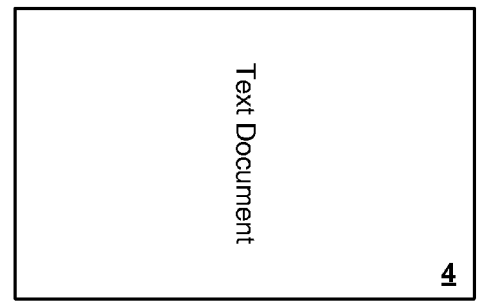
FIG. 1B is a drawing showing an exemplary text document in an orientation rotated 90 degrees clockwise from the "readable" orientation.
Figure 1C:
FIG. 1C is a drawing showing an exemplary text document in an orientation rotated 180 degrees clockwise from the "readable" orientation.
Figure 1D:
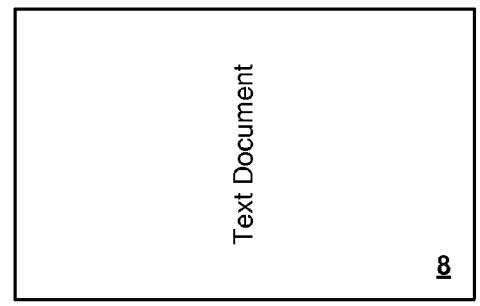
FIG. 1D is a drawing showing an exemplary text document in an orientation rotated 90 degrees counter clockwise from the "readable" orientation.

FIGS. 1A-1D depict several document orientations in relation to a readable orientation, also considered the "up" orientation. FIG. 1A shows an exemplary text document 2 in a readable orientation, also considered a 0° orientation. FIG. 1B shows an exemplary text document 4 in a rotated 90° orientation, also considered a rotated clockwise 90° orientation, a rotated counter clockwise 270° orientation, a rotated right 90° orientation and a rotated left 270° orientation. FIG. 1C shows an exemplary text document 6 in a rotated 180° orientation, also considered an inverted orientation. FIG. 1D shows an exemplary text document 8 in a rotated 270° orientation, also considered a rotated clockwise 270° orientation, a rotated counter clockwise 90° orientation, a rotated right 270° orientation and a rotated left 90° orientation.

Rotated electronic pages may require a user to manually correct orientation by physically rotating the original document in the case of a copy or digitally flipping or rotating a page in document viewer or other image or document processing application in the case of a scan.

Some embodiments of the present invention may determine whether an electronic document image is in the readable orientation or whether the electronic document image is rotated 90°, 180° or 270° with respect to the readable orientation. These orientations may be referred to as the four cardinal orientations. Some embodiments of the present invention may determine the language or language family of the text in the electronic document image or portion of the image.

Some embodiments of the present invention may determine page orientation of an electronic document image using a measure of a distribution of glyph features. Other embodiments of the present invention may determine the language or language family of the text in an electronic document image or portion of the image using a measure of a distribution of glyph features.

Some embodiments of the present invention may use supervised training methods to build a prototypical distribution of glyph features over a page or a text region from a set of training data samples. For each training sample, the orientation of the text in the training sample and the language or language family of the text in the training sample may be provided. The training data may form a library of prototypical page, or other region, glyph-feature distributions.

Some embodiments of the present invention may use the library of prototypical page, or other region, glyph-feature distributions to match to page, or other region, distributions of data.

Alternative embodiments of the present invention may use a multivariate statistical model of language-family glyph-feature distributions to determine orientation and language family. Some of these embodiments may use Maximum Likelihood (ML) classifiers. Alternative embodiments may use Maximum a priori Probability (MAP) classifiers. Still alternative embodiments may use Minimum Risk classifiers.

Some embodiments of the present invention may comprise glyph-feature distributions that correspond to the occurrence rates of 2-dimensional patterns within characters and the spatial relationship of the patterns. In some embodiments of the present invention, the glyph-feature distributions may have known 90° rotation properties such that model or observed data may be manipulated to determine rotated models or observed data. In these embodiments, a training procedure may require modeling or observation of a single orientation.

Some embodiments of the present invention may detect page orientation and language family for a digital document using glyph features. The term glyph may designate individual characters and symbols used in a written language. Some embodiments of the present invention may use glyph asymmetries in the written alphabet associated with a language to determine document orientation. Some embodiments of the present invention may use glyph asymmetries in the written alphabet associated with a language to determine the document language or language family. Some embodiments of the present invention may determine a confidence associated with a detection result. A language family may be a set of written languages that have similar characteristics with respect to orientation.

Some embodiments of the present invention may use binary corner patterns and may encode the quadrant location relative to a glyph reference position to encode character asymmetry. Some embodiments of the present invention may use of the number of glyph binary corner pattern distributions for language classification to detect the language or the language family of text data. Some embodiments of the present invention may use binary corner patterns to train a classifier and to build orientation prototypes. Some embodiments of the present invention may use binary corner patterns to develop a multivariate-statistical-model-based classifier.

Figure 2:
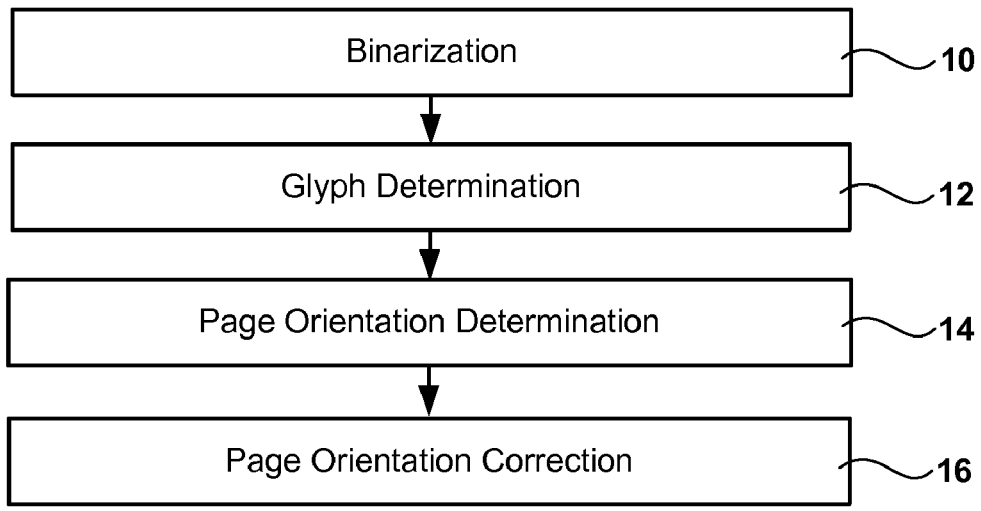
FIG. 2 is a chart showing embodiments of the present invention comprising document orientation correction.

Some embodiments of the present invention may be described in relation to FIG. 2. An electronic document image may be binarized 10. Exemplary binarization methods may comprise locally adaptive binarization methods, including the local methods of Bernsen, Chow and Kaneko, Eikvil et al., Mardia and Hainsworth, Niblack, Taxt et al., Yanowitz and Bruckstein, Parker, White and Rohrer's dynamic thresholding algorithm, White and Rohrer's integrated function algorithm and other local methods, and global binarization methods, including the global methods of Abutaleb, Kapur et al., Kittler and Illingworth, Otsu and other global methods. In some embodiments of the present invention, binarization may comprise block-based Otsu binarization using 32×32 pixel blocks.

Binarization 10 may be followed by glyph determination 12. A glyph may be an individual character or symbol used in a written language. During glyph determination 12, the binarization result may be processed by a connected-component algorithm to identify, also considered label, glyph components. In some embodiments, glyph determination 12 may comprise a 4-way connected-component analysis. In alternative embodiments, glyph determination 12 may comprise an 8-way connected-component analysis. In some embodiments, glyph determination 12 may also comprise calculation of glyph-component properties. Exemplary glyph-component properties may include glyph-component bounding box, glyph-component area, glyph-component centroid, glyph-component bounding box area, glyph-component bounding box center and other properties. A single glyph component may comprise a single glyph character. Due to image noise or other factors, a single glyph component may comprise multiple glyph characters or non-glyph content, or a single glyph character may be split about multiple components.

Page orientation may be determined 14 from the glyph components and the glyph-component properties. The electronic document image may be corrected 16 according to the detected page orientation to place the electronic document image in a readable, or otherwise desirable, orientation.

Figure 3:
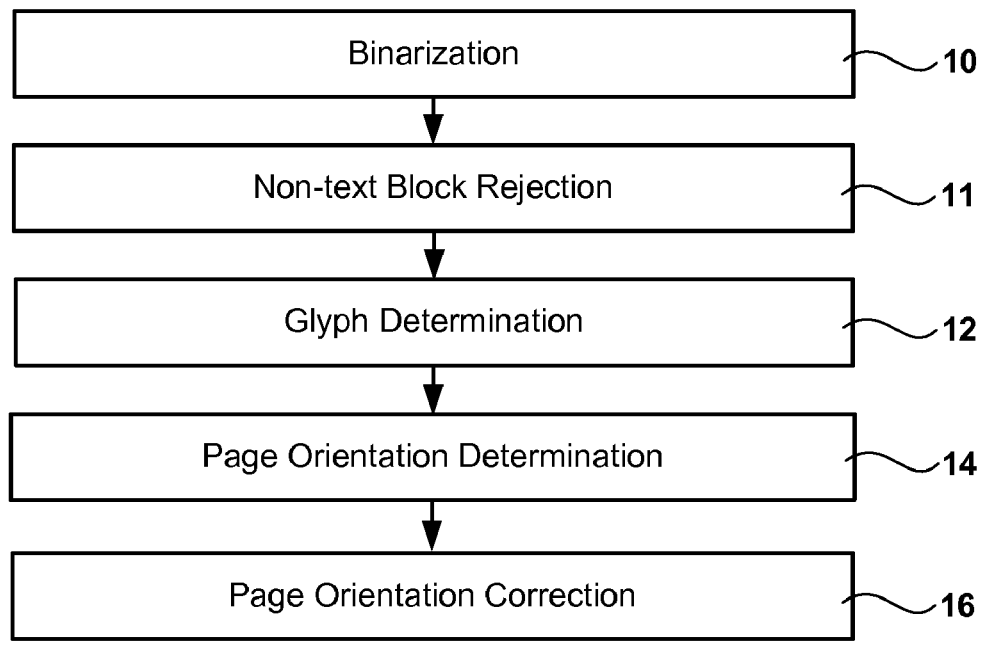
FIG. 3 is a chart showing embodiments of the present invention comprising non-text rejection after image binarization.

In some embodiments of the present invention described in relation to FIG. 3, block-level filtering 11 to reject non-text blocks may be performed after binarization 10 and prior to glyph determination 12. In some embodiments of the present invention, block-level filtering 11 may comprise rejecting blocks that do not meet a within-block contrast criterion or a quality of two-class fit.

Figure 4:
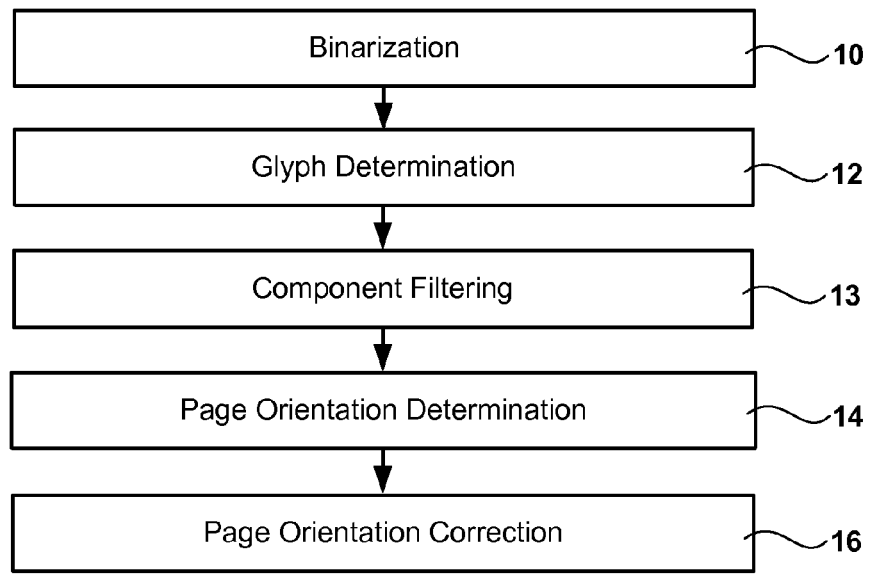
FIG. 4 is a chart showing embodiments of the present invention comprising component filtering.

In some embodiments of the present invention described in relation to FIG. 4, component filtering 13 to reject glyph components that may be noise may be performed after glyph determination 12 and prior to page orientation determination 14. In some embodiments of the present invention, component filtering 13 may comprise rejecting glyph components that meet a size criterion. Exemplary size criteria may include size below a threshold, size above a threshold based on median component area, glyph width below a threshold and other size criterion.

Some embodiments of the present invention may comprise both block-level filtering and component filtering.

In some embodiments of the present invention, page orientation determination 14 may be based on the distribution of binary feature points for a glyph component relative to a glyph-component reference point. In some embodiments of the present invention described in relation to FIG. 5A, the reference point for a glyph component 30 may be the center 32 of the glyph-component bounding box 34. The center 32, which may be denoted ($c_x$, $c_y$), of the glyph-component bounding box 34 may be determined according to:

$$c_x = \frac{\max_x\{glyph\} + \min_x\{glyph\}}{2},$$

$$c_y = \frac{\max_y\{glyph\} + \min_y\{glyph\}}{2},$$

where {glyph} may denote the set of pixels that may comprise the glyph component.

Figures 5A, 5B:
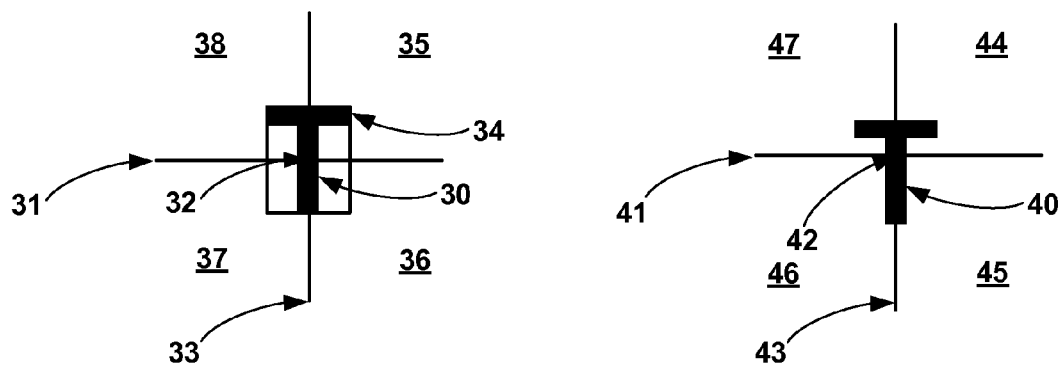
FIG. 5A is a drawing showing an exemplary glyph component with a glyph-component reference point at the center of the glyph-component bounding box.
FIG. 5B is a drawing showing an exemplary glyph component with a glyph-component reference point at the centroid of the glyph component.
Figure 6A:
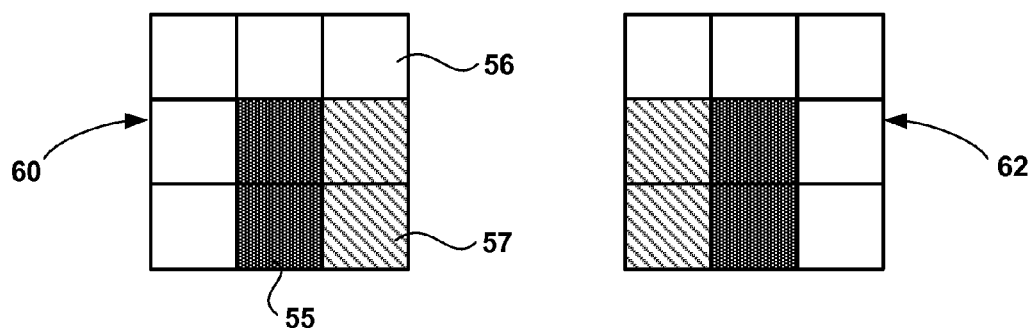
FIG. 6A is a drawing showing exemplary pixel patterns corresponding to a glyph feature which may be referred to as "upward pointing;"
Figure 6B:
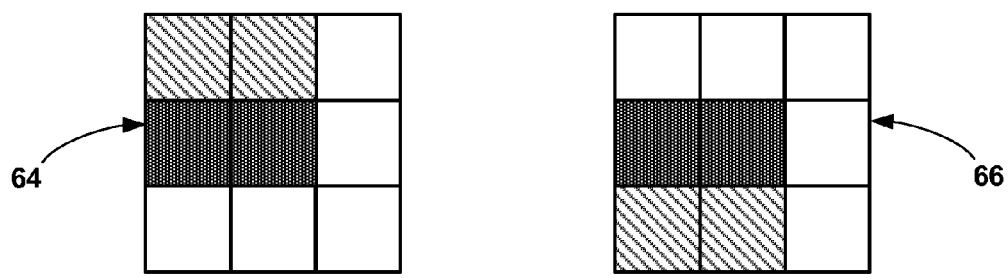
FIG. 6B is a drawing showing exemplary pixel patterns corresponding to a glyph feature which may be referred to as "rightward pointing;"
Figure 6C:
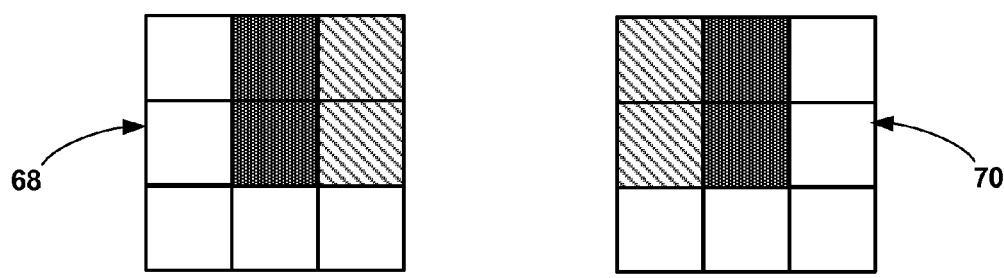
FIG. 6C is a drawing showing exemplary pixel patterns corresponding to a glyph feature which may be referred to as "downward pointing;"

In alternative embodiments of the present invention described in relation to FIG. 5B, the reference point for a glyph component 40 may be the centroid 42 of the glyph component 40. The centroid 42, which may be denoted ($c_x$, $c_y$), of the glyph component 40 may be determined according to:

$$c_x = \frac{\sum_x \{glyph\}}{area}, c_y = \frac{\sum_y \{glyph\}}{area},$$

where area may denote the area of the glyph component 40. In some embodiments, the area of the glyph component 40 may be measured by the number of glyph pixels.

In some embodiments of the present invention, the relative placement of a feature point in a glyph component may be described in relation to the reference point for the glyph component. In some embodiments of the present invention, the placement of a feature point in a glyph component may be described by the quadrant in which the feature point is located. In an exemplary of the present invention, the glyph-component reference point may be the origin of the quadrant decomposition.

In some embodiments of the present invention illustrated in relation to FIG. 5A, the reference point may be the center 32 of the glyph-component bounding box 34. For an exemplary raster-scan coordinate system, which may be a coordinate system with the origin in the upper-left corner of the image with positive-x coordinates corresponding to horizontal location within the image and positively coordinates corresponding to vertical location within the image, the quadrant of a glyph-feature point, (fx, fy), also referred to as a feature point, may be determined according to:

upper-right quadrant 35 if (fx−$c_x$)≧0 and (fy−$c_y$)≦0;

lower-right quadrant 36 if (fx−$c_x$)≧0 and (fy−$c_y$)≧0;

lower-left quadrant if 37 (fx−$c_x$)≧0 and (fy−$c_y$)≧0;

upper-left quadrant if 38 (fx−$c_x$)≦0 and (fy−$c_y$)≦0.

In some embodiments of the present invention, if a feature point is located on a quadrant dividing line 31, 33, then the feature point may be considered to be located in both quadrants. In alternative embodiments of the present invention, if a feature point is located on a quadrant dividing line 31, 33, then the feature point may be considered to be located in a default quadrant in relation to the dividing line.

In some embodiments of the present invention, if a feature point is located on the glyph-component reference point 32, then the feature point may be considered to be located in all four quadrants. In alternative embodiments of the present invention, if a feature point is located on the glyph-component reference point 32, then the feature point may be considered to be located in a default quadrant.

In some embodiments of the present invention illustrated in relation to FIG. 5B, the reference point may be the centroid 42 of the glyph component 40. For an exemplary raster-scan coordinate system, which may be a coordinate system with the origin in the upper-left corner of the image with positive-x coordinates corresponding to horizontal location within the image and positive-y coordinates corresponding to vertical location with in the image, the quadrant of a glyph-feature point, (fx, fy), also referred to as a feature point, may be determined according to:

upper-right quadrant 44 if (fx−$c_x$)≧0 and (fy−$c_y$)≦0;

lower-right quadrant 45 if (fx−$c_x$)≧0 and (fy−$c_y$)≧0;

lower-left quadrant if 46 (fx−$c_x$)≦0 and (fy−$c_y$)≧0;

upper-left quadrant if 47 (fx−$c_x$)≦0 and (fy−$c_y$)≦0.

In some embodiments of the present invention, if a feature point is located on a quadrant dividing line 41, 43, then the feature point may be considered to be located in both quadrants. In alternative embodiments of the present invention, if a feature point is located on a quadrant dividing line 41, 43, then the feature point may be considered to be located in a default quadrant in relation to the dividing line.

In some embodiments of the present invention, if a feature point is located on the glyph-component reference point 42, then the feature point may be considered to be located in all four quadrants. In alternative embodiments of the present invention, if a feature point is located on the glyph-component reference point 42, then the feature point may be considered to be located in a default quadrant.

In some embodiments of the present invention, the upper-right quadrant may be considered quadrant 1, or the first quadrant; the lower-right quadrant may considered quadrant 2, or the second quadrant; the lower-left quadrant may considered quadrant 3, or the third quadrant; and the upper-left quadrant may considered quadrant 4, or the fourth quadrant. In alternative embodiments, the numbering of the quadrants may be different.

In some embodiments of the present invention, the location of a glyph feature point may be described in relation to a single region associated with the glyph. In alternative embodiments of the present invention, the location of a glyph feature point may be described in relation to sub-regions of a bounding box associated with the glyph. In some of these embodiments, the regions may overlap, and in other alternative embodiments, the regions may be non-overlapping. In some embodiments, the bounding box may be partitioned into nine sub-regions, wherein in some of these embodiments, the sub-regions may be of equal size and arranged in a 3×3, non-overlapping arrangement. In alternative embodiments, the bounding box may be partitioned into two sub-regions, wherein each sub-region may correspond to half of the bounding box. Exemplary partitions may include a top-half/bottom-half partition and a right-half/left-half partition.

In some embodiments of the present invention, pixel-pattern-based features may be used in determining page orientation. FIGS. 6A-6H depict twelve exemplary 3×3 patterns which may be associated with eight exemplary pattern features. The patterns 60, 62 shown in FIG. 6A may be associated with a glyph feature which may be referred to as "upward pointing." The patterns 64, 66 shown in FIG. 6B may be associated with a glyph feature which may be referred to as "rightward pointing." The patterns 68, 70 shown in FIG. 6C may be associated with a glyph feature which may be referred to as "downward pointing." The patterns 72, 74 shown in FIG. 6D may be associated with a glyph feature which may be referred to as "leftward pointing." The pattern 76 shown in FIG. 6E may be associated with a glyph feature which may be referred to as "up-right open." The pattern 78 shown in FIG. 6F may be associated with a glyph feature which may be referred to as "down-right open." The pattern 80 shown in FIG. 6G may be associated with a glyph feature which may be referred to as "down-left open." The pattern 82 shown in FIG. 6H may be associated with a glyph feature which may be referred to as "up-left open."

A pixel in a glyph component may be considered a glyph-feature point associated with a particular glyph feature when the pixel and its surrounding 8-nearest-neighbors match any of the pixel patterns associated with the particular glyph feature. The pixel may be considered the center pixel in the feature pattern. A pattern associated with a glyph feature may be described by pixels that correspond to non-glyph pixels in a glyph component, pixels that correspond to glyph pixels in the glyph component and pixels that correspond to either glyph or non-glyph pixels, also considered "don't care" pixels, in the glyph component. In the exemplary patterns shown in FIGS. 6A-6H, the non-glyph pixels may be pixels shown in the pattern by a white square, for example 55. A pixel shown in the pattern by a dark-shaded square, for example 56, may correspond to a glyph pixel in a glyph pixel, and a pixel shown by line-hatching, for example 57, may correspond to a "don't care" pixel.

Figure 7:
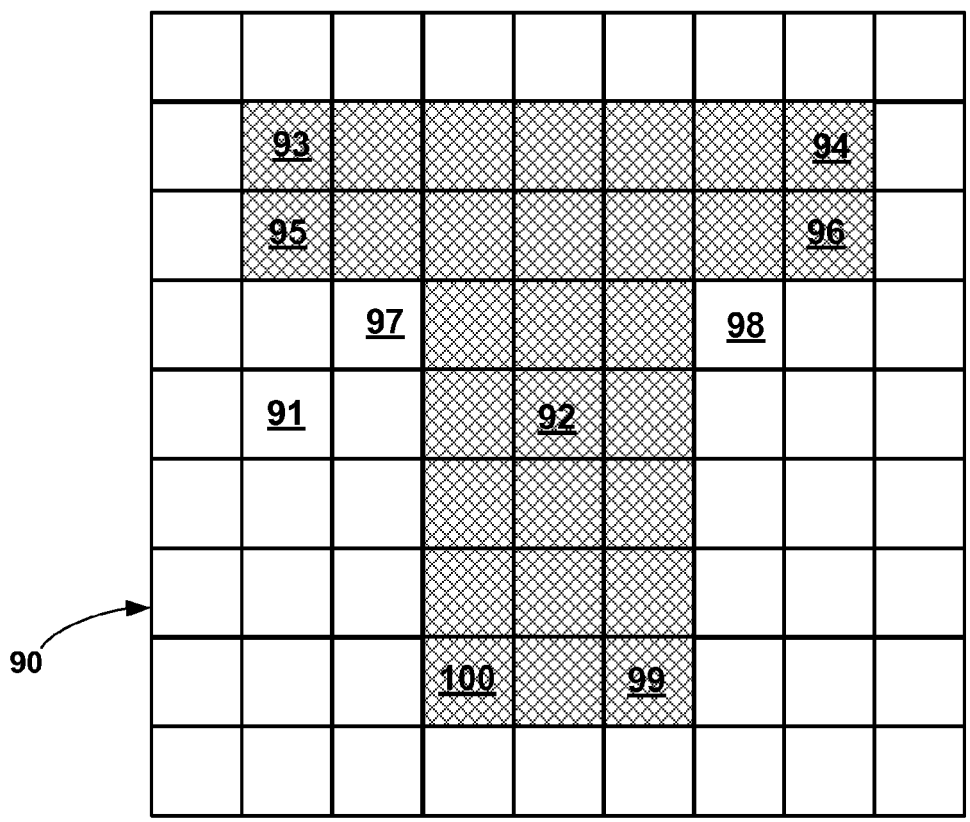
FIG. 7 is a drawing showing an exemplary glyph component.

The above-described glyph-feature points may be illustrated in relation to an exemplary glyph component 90 shown in FIG. 7. Non-glyph pixels are those shown as white squares, for example 91, and glyph pixels are those shown in cross-hatch, for example 92. Pixel 93 may be a glyph-feature point associated with both the "upward pointing" feature and the "leftward pointing" feature. Pixel 94 may be a glyph-feature point associated with both the "upward pointing" feature and the "rightward pointing" feature. Pixel 95 may be a glyph-feature point associated with both the "downward pointing" feature and the "leftward pointing" feature. Pixel 96 may be a glyph-feature point associated with both the "downward pointing" feature and the "rightward pointing" feature. Pixel 97 may be a glyph-feature point associated with the "down-left open" feature. Pixel 98 may be a glyph-feature point associated with the "down-right open" feature. Pixel 99 may be a glyph-feature point associated with the both the "downward pointing" feature and the "rightward pointing" feature. Pixel 100 may be a glyph-feature point associated with the "downward pointing" feature and the "leftward pointing" feature.

In some embodiments of the present invention, the frequency of occurrence of the pixel-pattern-based features and their relative location for a glyph component may be combined with those of other glyph components to form region or page statistics. The region or page statistics may give a more robust estimate of orientation.

In some embodiments of the present invention, a pixel-pattern-based feature and relative location occurrence may be accumulated into a distribution matrix where the quadrant location indexes the matrix row and the pixel-pattern-based feature indexes the column. For each glyph-feature occurrence within a glyph component, which may be denoted g, the corresponding element in the distribution matrix for the glyph component, which may be denoted $dm_g$, may be accumulated.

For the eight exemplary pixel-pattern features described in relation to FIGS. 6A-6H above, the distribution matrix $dm_g$ may take the form:

$$dm_g = \begin{pmatrix} e_{1,1} & e_{1,2} & e_{1,3} & e_{1,4} & e_{1,5} & e_{1,6} & e_{1,7} & e_{1,8} \\ e_{2,1} & e_{2,2} & e_{2,3} & e_{2,4} & e_{2,5} & e_{2,6} & e_{2,7} & e_{2,8} \\ e_{3,1} & e_{3,2} & e_{3,3} & e_{3,4} & e_{3,5} & e_{3,6} & e_{3,7} & e_{3,8} \\ e_{4,1} & e_{4,2} & e_{4,3} & e_{4,4} & e_{4,5} & e_{4,6} & e_{4,7} & e_{4,8} \end{pmatrix}$$

where an element $e_{i,j}$ in $dm_g$, also denoted $e_{i,j}(g)$, may represent the number of times the pixel-pattern-based feature j, where each j corresponds to one of the eight pixel-pattern-based features, occurred in quadrant i for the glyph component g. For a kth region, an accumulated distribution matrix, which may be denoted $DM_k$, may be the element-wise sum of all glyph component distribution matrices within the region $R^k$. This may be denoted:

$$DM_k = \sum_{\forall g \subseteq R^k} dm_g,$$

where an element in $DM_k$ may be denoted $e_{i,j}^k$ and determined according to:

$$e_{i,j}^k = \sum_{\forall g \subseteq R^k} e_{i,j}(g).$$

There may exist a relationship between the distribution matrix, $dm_g$, of a glyph component and the distribution matrix of glyph component comprised of a rotation of the glyph component. For the eight exemplary pixel-pattern features described in relation to FIGS. 6A-6H above and the exemplary quadrant decompositions illustrated in FIGS. 5A-5B, the elements in a distribution matrix for a glyph component will permute according to:

$$\begin{pmatrix} e_{4,4} & e_{4,1} & e_{4,2} & e_{4,3} & e_{4,8} & e_{4,5} & e_{4,6} & e_{4,7} \\ e_{1,4} & e_{1,1} & e_{1,2} & e_{1,3} & e_{1,8} & e_{1,5} & e_{1,6} & e_{1,7} \\ e_{2,4} & e_{2,1} & e_{2,2} & e_{2,3} & e_{2,8} & e_{2,5} & e_{2,6} & e_{2,7} \\ e_{3,4} & e_{3,1} & e_{3,2} & e_{3,3} & e_{3,8} & e_{3,5} & e_{3,6} & e_{3,7} \end{pmatrix}$$

for a clockwise rotation of the glyph component by 90°; to:

$$\begin{pmatrix} e_{3,3} & e_{3,4} & e_{3,1} & e_{3,2} & e_{3,7} & e_{3,8} & e_{3,5} & e_{3,6} \\ e_{4,3} & e_{4,4} & e_{4,1} & e_{4,2} & e_{4,7} & e_{4,8} & e_{4,5} & e_{4,6} \\ e_{1,3} & e_{1,4} & e_{1,1} & e_{1,2} & e_{1,7} & e_{1,8} & e_{1,5} & e_{1,6} \\ e_{2,3} & e_{2,4} & e_{2,1} & e_{2,2} & e_{2,7} & e_{2,8} & e_{2,5} & e_{2,6} \end{pmatrix}$$

for a clockwise rotation of the glyph component by 180°; and to:

$$\begin{pmatrix} e_{2,2} & e_{2,3} & e_{2,4} & e_{2,1} & e_{2,6} & e_{2,7} & e_{2,8} & e_{2,5} \\ e_{3,2} & e_{3,3} & e_{3,4} & e_{3,1} & e_{3,6} & e_{3,7} & e_{3,8} & e_{3,5} \\ e_{4,2} & e_{4,3} & e_{4,4} & e_{4,1} & e_{4,6} & e_{4,7} & e_{4,8} & e_{4,5} \\ e_{1,2} & e_{1,3} & e_{1,4} & e_{1,1} & e_{1,6} & e_{1,7} & e_{1,8} & e_{1,5} \end{pmatrix}$$

for a clockwise rotation of the glyph component by 270°, where feature 1 may correspond to the "upward pointing" feature, feature 2 may correspond to the "rightward pointing" feature, feature 3 may correspond to the "downward pointing" feature, feature 4 may correspond to the "leftward pointing" feature, feature 5 may correspond to the "up-right open" feature, feature 6 may correspond to the "down-right open" feature, feature 7 may correspond to the "down-left open" feature and feature 8 may correspond to the "up-left open" feature.

A 90° rotation may be summarized as a permutation operation of the form $dm_g(90°)$=permute($dm_g$)=$P_{Row}dm_gP_{Col}$ where:

$$P_{Row} = \begin{pmatrix} 0 & 0 & 0 & 1 \\ 1 & 0 & 0 & 0 \\ 0 & 1 & 0 & 0 \\ 0 & 0 & 1 & 0 \end{pmatrix} \text{ and } P_{Col} = \begin{pmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 1 & 0 & 0 & 0 & 0 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 1 & 0 & 0 & 0 \end{pmatrix}.$$

An 180° rotation may be summarized as a permutation operation of the form $dm_g(180°)$=permute($dm_g(90°)$)= $P_{Row}dm_g(90°)P_{Col}$=$P_{Row}P_{Row}dm_gP_{Col}P_{Col}$ where $P_{Row}$ and $P_{Col}$ are given above.

A 270° rotation may be summarized as a permutation operation of the form $dm_g(270°)$=permute($dm_g(180°)$)= $P_{Row}dm_g(181°)P_{Col}$=$P_{Row}P_{Row}P_{Row}dm_gP_{Col}P_{Col}P_{Col}$ where $P_{Row}$ and $P_{Col}$ are given above.

In some embodiments of the present invention, due to the relationships between distribution matrices, a training method may train on a single document orientation to produce distribution matrices for all four cardinal orientations.

In some embodiments of the present invention, due to the permutation relationship between glyph-features at different orientations, orientation data corresponding to a first orientation may be stored, and the orientation data may be permuted as needed to generate the identification vectors at alternative orientations. In alternative embodiments, orientation data may be stored for all required orientations.

In some embodiments of the present invention, pixel-pattern-based features may be used for language or language family identification. A useful statistic for language, or language family determination, may be the distribution of the number of pixel-pattern-based features found on glyph components over a region or page. For a variety of language families, the glyph component set for each different written language may produce a different distribution of the number of features per glyph component. For example, in Latin alphabet systems, the characters tend to have a fewer number of pixel-pattern-based features per character than Asian languages.

Figure 8:
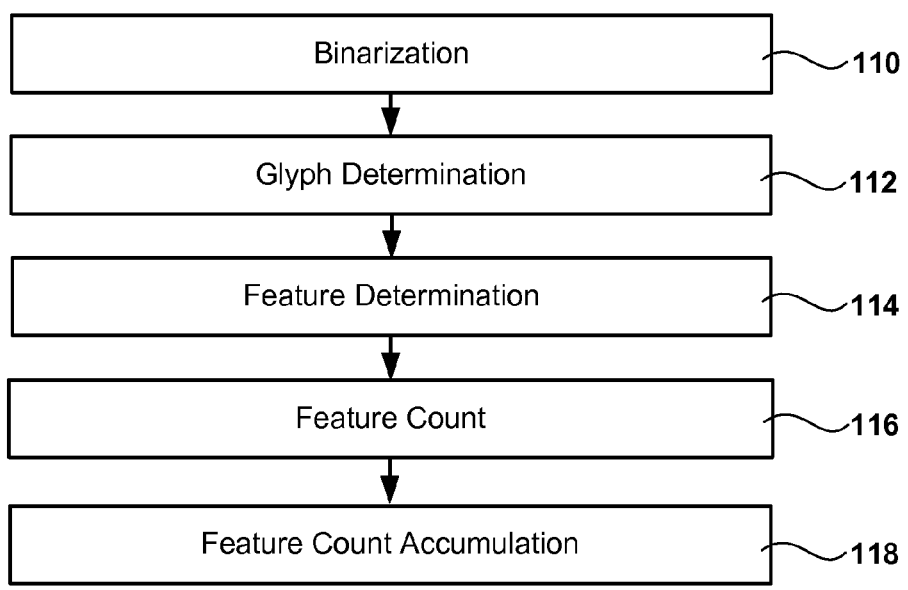
FIG. 8 is chart showing embodiments of the present invention comprising glyph-feature count.

In some embodiments of the present invention described in relation to FIG. 8, the distribution of the number of features per glyph component may be determined. After binarization 110, glyph component determination 112, and feature determination 114 for each glyph component, the number of features may be counted 116 for each glyph component, the number of features per component may be accumulated 118 to form a distribution feature for the region or page. The accumulation array may be considered a histogram, also considered a distribution vector, DV, wherein each bin in the histogram, or element in the vector, may accumulate the number of glyph components comprising the number of pixel-pattern-based features associated with the bin. The distribution vector may be determined according to:

1. initialize distribution vector to zero: DV=0;
2. for all glyph components within a region $R^k$:
   a. sum the number of features for a glyph component according to:

$$\text{num\_features}_g = \sum_i \sum_j e_{i,j} \text{ and}$$

b. accumulate a count for bin corresponding to number of features in the glyph according to:

DV(num_features$_g$)=DV(num_features$_g$)+1, where 0 is the zero vector.

The distribution feature may be used in some embodiments of the present invention to determine the language or language family of the written text in the electronic document.

Figure 9:
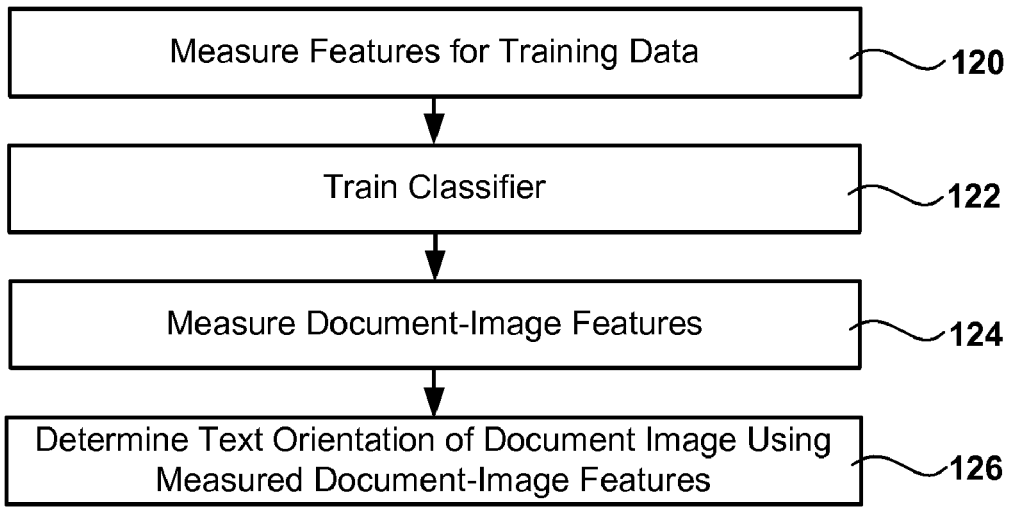
FIG. 9 is a chart showing embodiments of the present invention comprising supervised training for document orientation detection.

Some embodiments of the present invention described in relation to FIG. 9 may comprise text orientation determination based on a supervised-training method. In these embodiments, features may be measured 120 for a training data set, a classifier may be trained 122 using the measurements made for the training data set and a supervised labeling of the orientation of the training data. Feature measurements may then be made 124 on a document image, and the document orientation may be determined 126 using the trained classifier and the document-image features.

Figure 10:
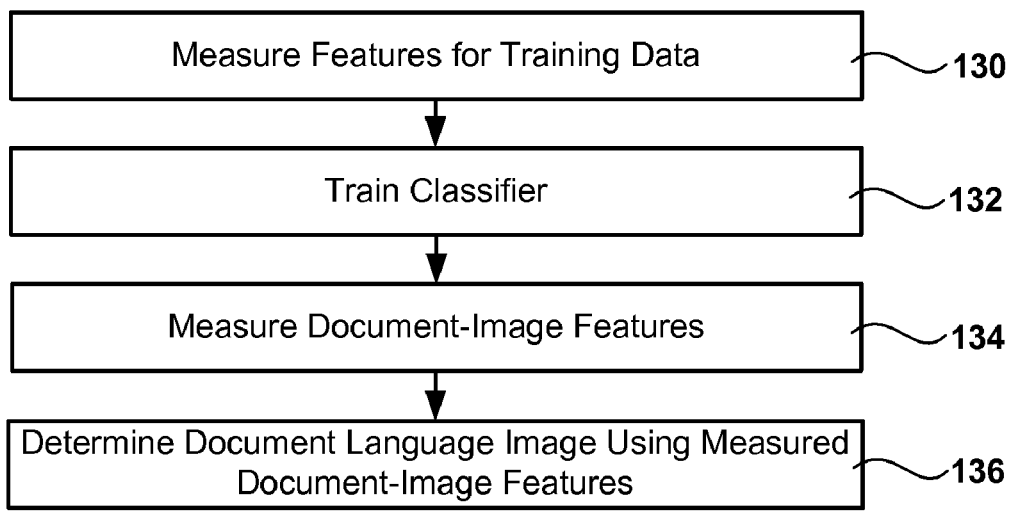
FIG. 10 is a chart showing embodiments of the present invention comprising supervised training for language detection.

Some embodiments of the present invention described in relation to FIG. 10 may comprise text language determination based on a supervised-training method. In these embodiments, features may be measured 130 for a training data set, a classifier may be trained 132 using the measurements made for the training data set and a supervised labeling of the language of the training data. Feature measurements may then be made 134 on a document image, and the document language may be determined 136 using the trained classifier and the document-image features.

In some embodiments of the present invention, a prototypical distribution matrix and distribution vectors for each language family may be used for classifier training. The prototypical distributions may be generated by supervised training on a set of typical documents from a plurality of language families.

A prototypical distribution may be determined by averaging the normalized distributions over the training set for each language. In some embodiments of the present invention, orientation and language labels for a training data may be carried as meta-data associated with the binarized image data portion of the training data. In some embodiments of the present invention, the training method may normalize the training data to be from a reference orientation, for example, the "readable" orientation, also considered the "up" orientation. This distribution matrix may be denoted $DM_{n,D=U}$, for the nth training sample in the reference orientation. A training sample may comprise a region or page of a document image. Each training distribution matrix for a language may be normalized to obtain the distribution matrix, which may be denoted $\overline{DM}_{n,D=U}$, according to:

$$\overline{DM}_{n,D=U} = \frac{DM_{n,D=U}}{\sum_i \sum_j e_{i,j}^n}.$$

In alternative embodiments, the normalized value may be generalized to be a value other than unity according to:

$$\overline{DM}_{n,D=U} = \frac{C}{\sum_i \sum_j e_{i,j}^n} DM_{n,D=U},$$

where C may be predefined constant.

A prototypical distribution matrix may be obtained by averaging each element in matrix across the training samples for a language or language family, which may be denoted F, according to:

$$\overline{DM}_{F,D=U} = \sum_{\forall n \subseteq F} \overline{DM}_{n,F,D=U},$$

where n may indicate a training sample for language family F in the reference orientation.

Distribution matrices for other orientations may be determined based on permutations of the distribution matrix corresponding to the reference orientation. In some embodiments of the present invention, the reference orientation may be the "readable" orientation. In alternative embodiments, the reference orientation may be associated with an orientation other than the "readable" orientation.

In some embodiments of the present invention, a prototypical distribution vector for each language family may be determined from training samples according to:

$$\overline{DV}_n = \frac{DV_n}{\sum_i \sum_j e_{i,j}^n} \text{ and } \overline{DV}_F = \sum_n \overline{DV}_n,$$

where n may denote the nth training sample and F may denote the language family distribution which may determined by averaging across multiple training samples. The distribution vectors do not depend on orientation.

In some embodiments of the present invention, the classifier may be a best-match detector. A page orientation detection module may use the prototypical distributions calculated from training to identify the page orientation, the language or language family, and a confidence value. In some embodiments of the present invention, the confidence value may be used to reject the estimated page orientation. In alternative embodiments, the information calculated during a page orientation matching stage may be merged with additional information from other sources related to orientation. Exemplary information calculated during a page orientation matching stage may comprise the confidence measure for all likely matches.

Figure 11:
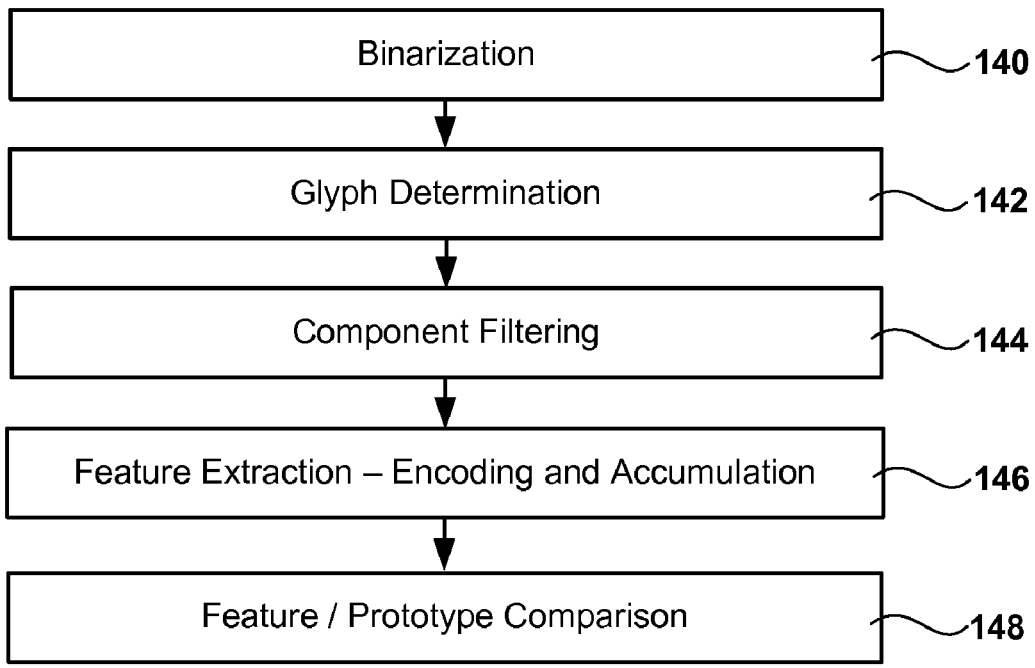
FIG. 11 is a chart showing embodiments of the present invention comprising prototype matching.

Some embodiments of the present invention may be described in relation to FIG. 11. A document image may be binarized 140, and glyph component candidates may be determined 142. The binarized, glyph component candidate results may be filtered 144 to reject components that do not conform to an expected glyph component structure. The result may be a binary glyph map comprising glyph components. Features may be extracted 146 from the glyph map thereby producing normalized distributions $\overline{DM}$ and $\overline{DV}$. These distributions may be compared with prototypical language and orientation distributions that may be calculated in an offline training procedure.

In some embodiments of the present invention, the comparison may generate a match score according to the correlation $\overline{DM} \cdot \overline{DM}_{F,D}$ between the measured distribution, $\overline{DM}$, and a prototypical distribution, $\overline{DM}_{F,D}$. Correlation may be defined according to:

$$\overline{DM} \cdot \overline{DM}_{F,D} = \sum_i \sum_j e_{i,j} \cdot e_{i,j}^{F,D},$$

the sum of the element-wise product between two matrices. For unit-normalized matrices the match score may vary from zero to one, where zero may represent a worst match and one a best match. The best-match comparison may generate match scores for all orientation and language/language family combinations. The best match may be determined according to:

$$(d, f) = \max_{D,F} \left( \sum_i \sum_j e_{i,j} \cdot e_{i,j}^{F,D} \right),$$

where D may be the orientations and F the language families. Thus, (d, f) may identify the prototypical distribution with the highest correlation score with the measured data.

In alternative embodiments of the present invention, a match score may be generated according to the sum of the absolute difference between two matrices according to:

$$\sum_i \sum_j |e_{i,j} - e_{i,j}^{F,D}|.$$

In these embodiments, zero may be the best match while one may be the worst match. The best-match comparison may generate match scores for all orientation and language/language family combinations. The best match may be determined according to:

$$(d, f) = \min_{D,F} \left( \sum_i \sum_j |e_{i,j} - e_{i,j}^{F,D}| \right),$$

where D may be the orientations and F the language families. Thus, (d, f) may identify the prototypical distribution with the smallest difference from the measured data.

In some embodiments of the present invention, the match score for language identification using the distribution vector may be determined by the correlation, $\overline{DV} \cdot \overline{DV}_F$. In alternative embodiments, the match score may be determined by the sum of the absolute difference, $\Sigma|\overline{DV} - \overline{DV}_F|$. The best match strategy for language identification may be given according to:

$$(f) = \max_F (\overline{DV} \cdot \overline{DV}_F)$$

for correlation and $$(f) = \min_F \left( \sum |\overline{DV} - \overline{DV}_F| \right)$$

for sum of absolute difference.

In some embodiments of the present invention, language classification may be performed prior to orientation detection. In these embodiments, the scope of language families used in orientation detection may be limited based on the prior language classification.

In alternative embodiments of the present invention, language determination and orientation detection may be determined in parallel, and the distribution matrix matches and matching strategy may return cues useful for both orientation and language family determination. This information may be combined with specialized language family matching. In some embodiments, the combination strategy may comprise a weighting of match scores. In alternative embodiments, the match scores may be input to a classifier.

Embodiments of the present invention have been described above in relation to a best-match detector. Alternative embodiments of the present invention may comprise classifiers based on pattern recognition methods.

Alternative learning methods including Neural Networks, Support Vector Machines (SVM), Hidden Markov Models (HMM) and other may be used in conjunction with the pixel-pattern-based features and encoding described herein to determine orientation and language.

In some embodiments of the present invention, a prototypical distribution used to represent the language family and orientation may be determined from an average of normalized distribution vectors. In these embodiments, a page, or portion of a page, may be classified to belong to the closest prototypical language family and orientation distribution. In alternative embodiments of the present invention, a statistical framework may be used, wherein given a set of glyph-feature distribution values, the language family or orientation of the input page, or region, may be identified.

Some embodiments of the present invention may comprise a probabilistic model of the feature distribution describing the likelihood, which may be denoted $p(X|L_i)$, of a feature vector X for each language family, $L_i$. In some of these embodiments, the likelihoods and prior information about the relative frequency of occurrence of each language family may be combined using Bayes' formula to compute the a posteriori probability, which may be denoted $P(L_i|X)$, of the ith language family given the feature vector X. This a posteriori probability may be determined according to:

$$P(L_i | X) = \frac{p(X | L_i) P(L_i)}{p(X)},$$

where the evidence term, p(X), is the likelihood of the feature vector X and $P(L_i)$ is the prior probability of the ith language family.

In some embodiments of the present invention, the language family given a feature vector may be determined by determining the language family with the maximum a posteriori probability according to:

$$MAP(L_i) = \max_i(P(L_i \mid X)) = \max_i(p(X \mid L_i)P(L_i)).$$

In these embodiments, a classifier may select the language family associated with the observed data as the language family having the highest probability given the data. This may be referred to as a MAP classifier.

In alternative embodiments of the present invention, all language families may be assumed equally likely, $P(L_1) = \ldots = P(L_N)$, where N is the number of language classes considered. In these embodiments, the MAP classifier is equivalent to the maximum likelihood classifer, $$ML(L_i) = \max_i(p(X \mid L_i)).$$

Some embodiments of the present invention may comprise calculating the likelihood, $p(X|L_i)$, of a feature vector X for each language family, $L_i$. In some embodiments, the likelihood function, also considered the density distribution, $p(X|L_i)$ may be modeled from training data of representative samples from each language family of interest. In some of these embodiments, the distribution of each language family may be characterized with a set of parameters. In alternative embodiments, the distribution of each language family may be characterized by a discrete approximation of the likelihood. In some embodiments of the present invention, memory constraints, speed requirements, the training set size or other factors may impact the choice of one methodology over another.

In some embodiments of the present invention, the density distribution may be modeled as a normal density function, $N(\mu, \Sigma)$, where the density mean vector, $\mu_{L_i}$, and covariance matrix, $\Sigma_{L_i}$, characterize the distribution for each language family. In some embodiments, the parameters $\mu_{L_i}$ and $\Sigma_{L_i}$ may be determined, and the likelihood of a feature vector may be determined according to:

$$p(X, L_i) = (2\pi)^{-\frac{n}{2}} |\Sigma_{L_i}|^{-\frac{1}{2}} \exp\left\{-\frac{1}{2}(X - \mu_{L_i})^T \Sigma_{L_i}^{-1} (X - \mu_{L_i})\right\},$$

where n is the number of features in the feature vector, |•| denotes determinant and T denotes transpose.

In some embodiments of the present invention, all language families may be considered equally likely. In some of these embodiments, the log likelihood may be used to form an equivalent classifier. In these embodiments:

$$\log(p(X, L_i)) = -\frac{1}{2}(X - \mu_{L_i})^T \Sigma_{L_i}^{-1} (X - \mu_{L_i}) + \log(k_{L_i}),$$

where $k_{L_i}$ represents a constant normalization term for the language family, $L_i$.

In some embodiments of the present invention, the parameters $\mu_{L_i}$ and $\Sigma_{L_i}$ may be determined for a language family, $L_i$, using training data representative of the language family. In alternative embodiments, the parameters $\mu_{L_i}$ and $\Sigma_{L_i}$ may be determined for a language family, $L_i$, through analysis of the symbols comprising the language alphabet and the frequency of occurrence of the symbols in the written text of the language.

Figure 12:
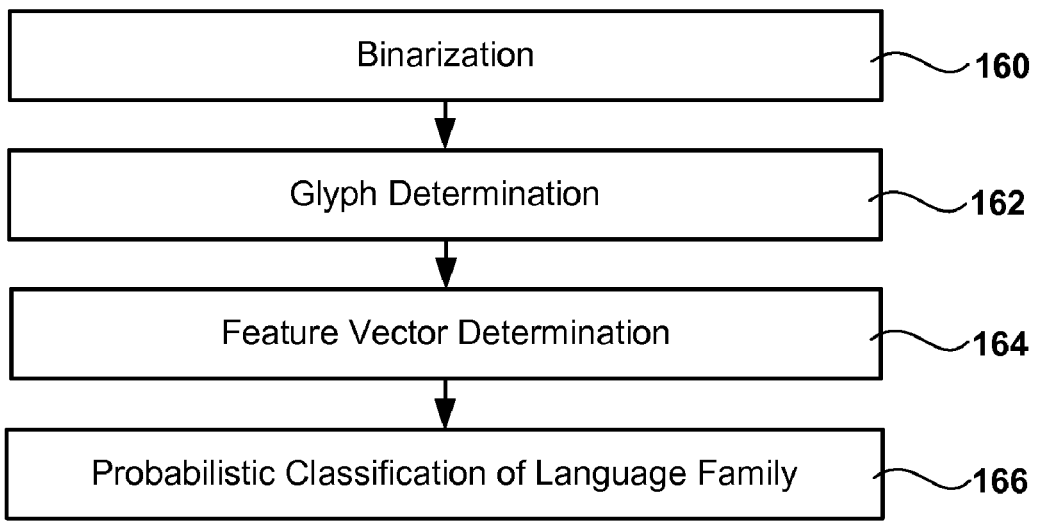
FIG. 12 is a chart showing embodiments of the present invention comprising probabilistic classification of language family.

Some embodiments of the present invention may be described in relation to FIG. 12. An electronic document image may be binarized 160. Exemplary binarization methods may comprise locally adaptive binarization methods, including the local methods of Bemsen, Chow and Kaneko, Eikvil et al., Mardia and Hainsworth, Niblack, Taxt et al., Yanowitz and Bruckstein, Parker, White and Rohrer's dynamic thresholding algorithm, White and Rohrer's integrated function algorithm and other local methods, and global binarization methods, including the global methods of Abutaleb, Kapur et al., Kittler and Illingworth, Otsu and other global methods. In some embodiments of the present invention, binarization may comprise block-based Otsu binarization using 32×32 pixel blocks.

Binarization 160 may be followed by glyph determination 162. A glyph may be an individual character or symbol used in a written language. During glyph determination 162, the binarization result may be processed by a connected-component algorithm to identify, also considered label, glyph components. In some embodiments, glyph determination 162 may comprise a 4-way connected-component analysis. In alternative embodiments, glyph determination 162 may comprise an 8-way connected-component analysis. In some embodiments, glyph determination 162 may also comprise calculation of glyph-component properties. Exemplary glyph-component properties may include glyph-component bounding box, glyph-component area, glyph-component centroid, glyph-component bounding box area, glyph-component bounding box center and other properties. A single glyph component may comprise a single glyph character. Due to image noise or other factors, a single glyph component may comprise multiple glyph characters or non-glyph content, or a single glyph character may be split about multiple components.

A feature vector, X, may be determined 164, and a probabilistic classifier 166 may determine, from the feature vector, the language family associated with the input document image.

Figure 13:
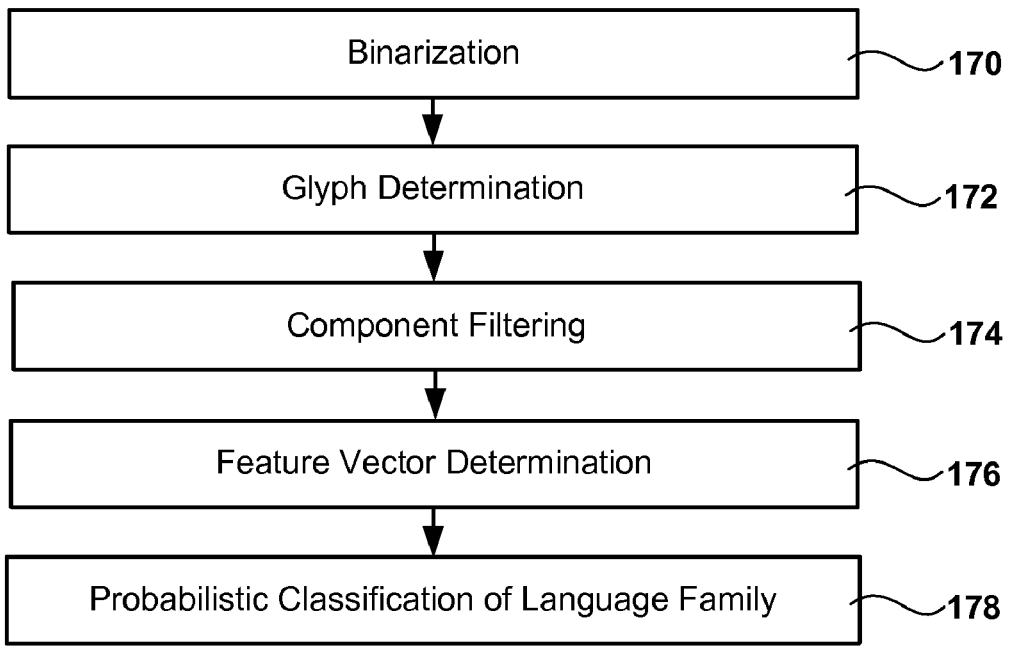
FIG. 13 is a chart showing embodiments of the present invention comprising component filtering.

In some embodiments of the present invention described in relation to FIG. 13, component filtering 174 may be performed after binarization 170 and glyph determination 172 to eliminate glyph components that may be noise. In some embodiments of the present invention, component filtering 174 may comprise rejecting glyph components that meet a size criterion. Exemplary size criteria may include size below a threshold, size above a threshold based on median component area, glyph width below a threshold and other size criterion. The glyph components that are not eliminated by the component filtering 174 may be used to determine a feature vector 176 corresponding to the input data, and the feature vector may be used in a probabilistic classifier 178 to determine the language or language family of the input data. In some embodiments of the present invention, the probabilistic classifier 178 may be a MAP classifier. In alternative embodiments, the probabilistic classifier 178 may be an ML classifier. In these embodiments, the orientation of the image may be considered known. If the orientation of the image data matches that of the model, then the classification 178 may be performed directly using the observed feature vector X. If the orientation of the image data does not match that of the model, then the feature vector relating to a rotation relative to the model may be obtained prior to classification 178.

Figure 14:
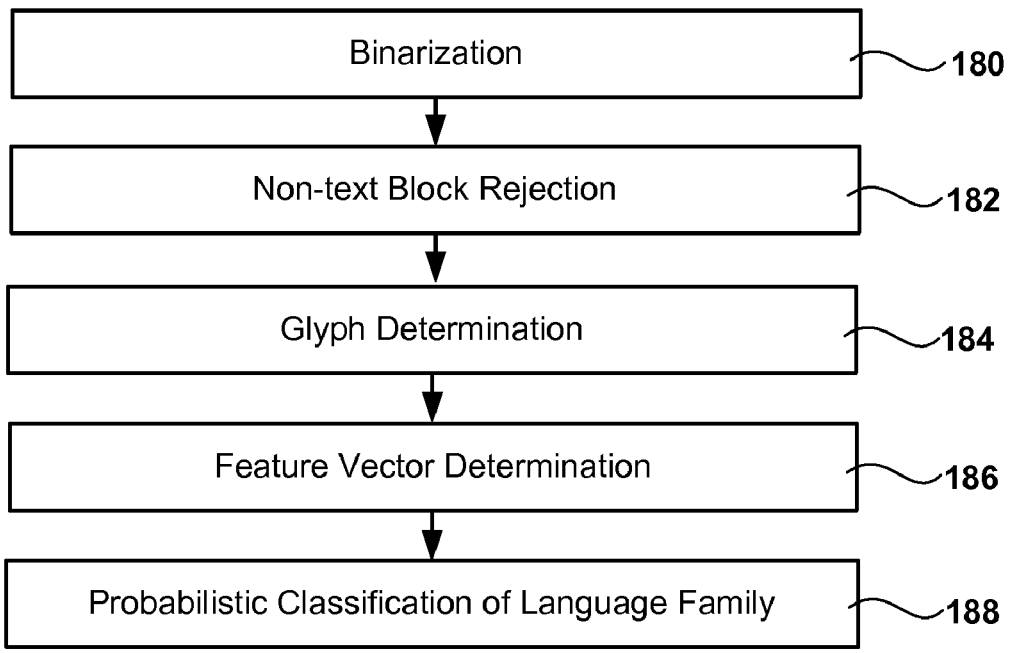
FIG. 14 is a chart showing embodiments of the present invention comprising non-text block rejection.

In some embodiments of the present invention described in relation to FIG. 14, non-text block rejection 182 may be performed after binarization 180 and prior to glyph determination 184 to eliminate non-text blocks. In some embodiments of the present invention, block-level filtering 182 may comprise rejecting blocks that do not meet a within-block contrast criterion or a quality of two-class fit. The blocks that are not rejected by non-text block rejection 182 may be used to identify 184 glyph components. The glyph components may be used to determine 186 a feature vector corresponding to the input data. The feature vector may be used in a probabilistic classifier 188 to determine the language or language family of the input data. In some embodiments of the present invention, the probabilistic classifier 188 may be a MAP classifier. In alternative embodiments, the probabilistic classifier 188 may be an ML classifier. In these embodiments, the orientation of the image may be considered known. If the orientation of the image data matches that of the model, then the classification 188 may be performed directly using the observed feature vector X. If the orientation of the image data does not match that of the model, then the feature vector relating to a rotation relative to the model may be obtained prior to classification 188.

Some embodiments of the present invention may comprise both block-level filtering and component filtering.

In some embodiments of the present invention, the feature vector, X, may be derived 164, 176, 189 from the distribution matrix, $DM_k$, associated with the glyph components. In some embodiments, $DM_k$ may be determined according to:

$$DM_k = \sum_{\forall g \subseteq R^k} dm_g,$$

where g may denote a candidate glyph component in the region $R^k$ under consideration.

In some embodiments of the present invention, the feature vector may comprise a vector obtained by concatenating the rows or columns of the distribution matrix into vector form.

An exemplary feature vector, X, corresponding to the exemplary distribution matrix:

$$DM_k = \begin{pmatrix} e^k_{1,1} & e^k_{1,2} & e^k_{1,3} & e^k_{1,4} & e^k_{1,5} & e^k_{1,6} & e^k_{1,7} & e^k_{1,8} \\ e^k_{2,1} & e^k_{2,2} & e^k_{2,3} & e^k_{2,4} & e^k_{2,5} & e^k_{2,6} & e^k_{2,7} & e^k_{2,8} \\ e^k_{3,1} & e^k_{3,2} & e^k_{3,3} & e^k_{3,4} & e^k_{3,5} & e^k_{3,6} & e^k_{3,7} & e^k_{3,8} \\ e^k_{4,1} & e^k_{4,2} & e^k_{4,3} & e^k_{4,4} & e^k_{4,5} & e^k_{4,6} & e^k_{4,7} & e^k_{4,8} \end{pmatrix}$$

may be:

$$X = [e^k_{1,1} e^k_{1,2} e^k_{1,3} e^k_{1,4} e^k_{1,5} e^k_{1,6} e^k_{1,7} e^k_{1,8} e^k_{2,1} e^k_{2,2} e^k_{2,3} e^k_{2,4} e^k_{2,5} e^k_{2,6} e^k_{2,7} e^k_{2,8} e^k_{3,1} e^k_{3,2} e^k_{3,3} e^k_{3,4} e^k_{3,5} e^k_{3,6} e^k_{3,7} e^k_{3,8} e^k_{4,1} e^k_{4,2} e^k_{4,3} e^k_{4,4} e^k_{4,5} e^k_{4,6} e^k_{4,7} e^k_{4,8}]^T.$$

In this exemplary feature vector, the vector is formed by concatenating the transposed rows of the distribution matrix in lexicographic order to form a column vector.

A feature vector may be permuted to derive feature distributions in alternative orientations. In some embodiments of the present invention, this may be required to obtain a feature vector when the observed feature vector is for image data at a different orientation than the model.

Using the permutation relationships described previously, a permutation relation may be derived for the exemplary feature vector described above.

A 90° rotation for this exemplary situation may be summarized as a permutation operation of the form $X^{(90°)}$=permute($X^{(0°)}$) where the permutation operation may be defined by a mapping according to:

mapping=(28, 25, 26, 27, 32, 29, 30, 31, 4, 1, 2, 3, 8, 5, 6, 7, 12, 9, 10, 11, 16, 13, 14, 15, 20, 17, 18, 19, 24, 21, 22, 23), where $X^{(90°)}(i) = X^{(0°)}$(mapping(i)), and $X^{(orientation)}(i)$ denotes the ith element of the feature vector X at the denoted orientation.

An 180° rotation for this exemplary situation may be summarized as a permutation operation of the form $X^{(180°)}$=permute($X^{(90°)}$) where the permutation operation may be defined by the mapping given above.

A 270° rotation for this exemplary situation may be summarized as a permutation operation of the form $X^{(270°)}$=permute ($X^{(180°)}$) where the permutation operation may be defined by the mapping given above.

In some embodiments of the present invention, the feature vector, X, may be derived from the normalized distribution matrix. In some of these embodiments, the normalization constant may be the number of candidate glyph components in the region $R^k$.

In some embodiments of the present invention, multivariate normal distribution parameters may be determined for a plurality of language families using training data in a readable (0°) orientation. These parameters may be denoted $N(\mu_{L_i,0}, \Sigma_{L_i,0})$ where $L_i$ denotes the ith language family and 0 denotes the readable orientation.

Figure 15:
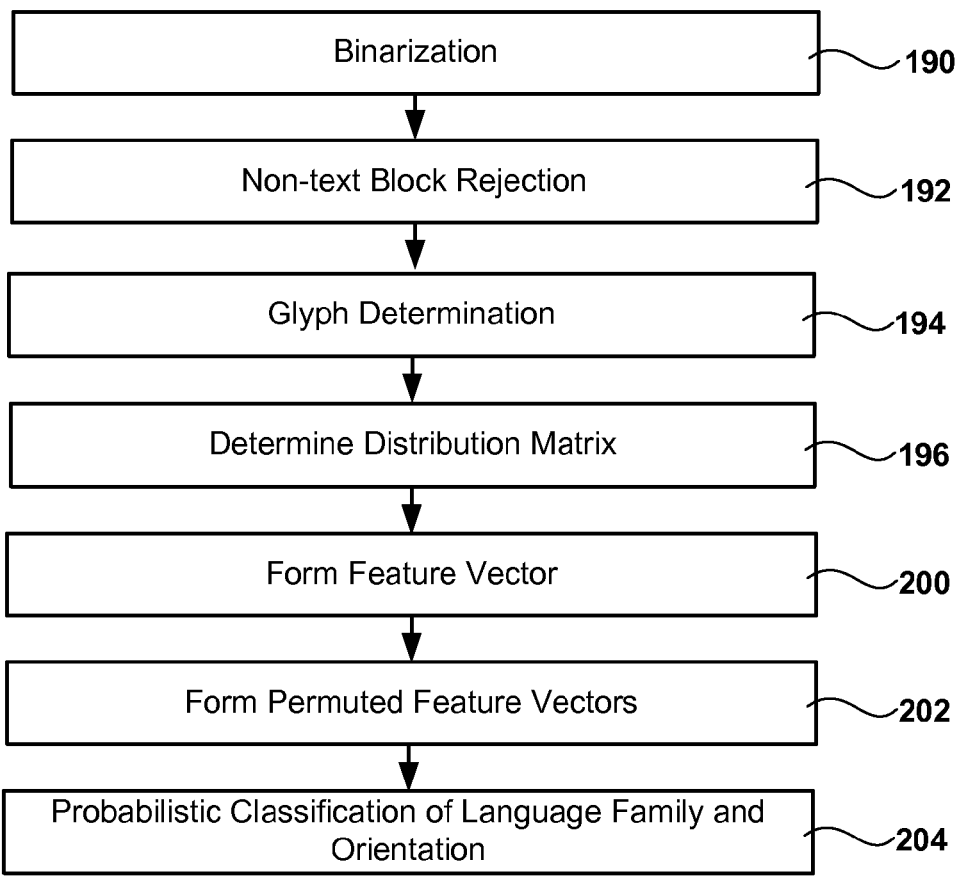
FIG. 15 is a chart showing embodiments of the present invention comprising joint classification of language family and orientation using a probabilistic classifier.

Some embodiments of the present invention described in relation to FIG. 15 may comprise calculation of joint orientation and language family likelihoods. An electronic document image may be binarized 190. In some embodiments of the present invention, non-text block rejection 192 may be performed after binarization 190 and prior to glyph determination 194 to eliminate non-text blocks. In alternative embodiments of the present invention, non-text block rejection 192 may not be performed. In some of these alternative embodiments, component filtering may be performed after binarization 190 and glyph determination 194 to eliminate glyph components that may be noise. In yet alternative embodiments of the present invention, both non-text block rejection and component filtering may be performed.

A feature distribution matrix may be determined 196 after glyph determination 194, and a feature vector may be formed 200 based on the feature distribution matrix. Permuted feature vectors may be formed 202 based on the feature vector. Joint determination of language family and orientation may be determined based on probabilistic classification 204. In some embodiments of the present invention, the probabilistic classifier 204 may be a MAP classifier. In alternative embodiments of the present invention, the probabilistic classifier 204 may be an ML classifier.

Some embodiments of the present invention may comprise a MAP classifier. In these embodiments, the language family and orientation may be selected according to:

$$MAP(L_i, k) = \max_{i,k}(P(L_i \mid X^{(k)})) = \max_{i,k}(p(X^{(k)} \mid L_i)P(L_i)),$$

where $L_i$ may refer to the language family and k the orientation. In some embodiments of the present invention in which the density function is modeled as a normal density function, the language family and orientation may be selected according to:

$$MAP(L_i, k) = \max_{i,k}\left(|\Sigma_{L_i}|^{-\frac{1}{2}} \exp\left\{-\frac{1}{2}(X^{(k)} - \mu_{L_i})^T \Sigma_{L_i}^{-1}(X^{(k)} - \mu_{L_i})\right\} P(L_i)\right).$$

In alternative embodiments, a log-likelihood may be used to form an equivalent MAP classifier according to:

$$MAP(L_i, k) =$$

$$\max_{i,k}\left(\left\{-\frac{1}{2}(X^{(k)} - \mu_{L_i})^T \Sigma_{L_i}^{-1}(X^{(k)} - \mu_{L_i})\right\} - \frac{1}{2}\log(|\Sigma_{L_i}|) + \log(P(L_i))\right).$$

Some embodiments of the present invention may comprise an ML classifier. In these embodiments, the language family and orientation may be selected according to:

$$ML(L_i, k) = \max_{i,k}(p(X^{(k)} | L_i)),$$

where $L_i$ may refer to the language family and k the orientation. In some embodiments of the present invention in which the density function is modeled as a normal density function, the language family and orientation may be selected according to:

$$ML(L_i, k) = \max_{i,k}\left(|\Sigma_{L_i}|^{-\frac{1}{2}} \exp\left\{-\frac{1}{2}(X^{(k)} - \mu_{L_i})^T \sum_{L_i}^{-1}(X^{(k)} - \mu_{L_i})\right\}\right).$$

In alternative embodiments, a log-likelihood may be used to form an equivalent ML classifier according to:

$$ML(L_i, k) = \max_{i,k}\left(\left\{-\frac{1}{2}(X^{(k)} - \mu_{L_i})^T \sum_{L_i}^{-1}(X^{(k)} - \mu_{L_i})\right\} - \frac{1}{2}\log\left(\left|\sum_{L_i}\right|\right)\right).$$

Some embodiments of the present invention may comprise determining a confidence value associated with a determined language family and orientation.

In some embodiments of the present invention comprising a MAP classifier, exemplary confidences values may comprise the likelihood value associated with the maximum, the log-likelihood value associated with the maximum, the difference between the minimum and maximum likelihood values, the difference between the minimum and maximum log-likelihood values, the difference between the maximum and the next largest likelihood values, the difference between the maximum and the next largest log-likelihood values, and other measures of the spread between the current best decision and the alternative decisions.

In some embodiments of the present invention comprising an ML classifier, exemplary confidences values may comprise the likelihood value associated with the maximum, the log-likelihood value associated with the maximum, the difference between the minimum and maximum likelihood values, the difference between the minimum and maximum log-likelihood values, the difference between the maximum and the next largest likelihood values, the difference between the maximum and the next largest log-likelihood values, and other measures of the spread between the current best decision and the alternative decisions.

Some embodiments of the present invention may comprise a probabilistic classifier which may incorporate into the decision rule a factor which may be related to the risk or loss of making incorrect decisions. These embodiments may optimize the behavior of the decision rule to factor not only the likelihood of a certain state given the data, but also the risk of accepting the decision given the true state deviates from the most likely state.

The introduction of conditional loss adds the cost of making decisions into a decision rule. In some embodiments, this may be used to force the classifier to make safer, or less costly, decisions when the likelihood of any one decision is weak or the risk of making the decision is high. The conditional loss, also considered the risk, denoted Risk($O_i$|X), for making decision, $O_i$, given the feature vector, X, may be formulated according to:

$$\text{Risk}(O_i | X) = \sum_{O_j = \{R0, J0, R90, J90...\}} \lambda(O_i | O_j) P(O_j | X),$$

where the notation has been updated to fold language family and orientation into one index. Indices with the same alphabetic prefix (for example, R0, R90, R180, and R270 refer to one language family while indices with the J prefix J0, J90, J180, and J270 refer to another language family). The index $O_i$ draws from a set of joint language family and orientation values. The conditional loss formula may be interpreted as: The conditional loss, or risk, of choosing orientation and language $O_i$ given the observation X, is equal to the sum of the loss, denoted, $\lambda(O_i|O_j)$, of choosing orientation and language $O_i$ given that the true state of the system is $O_j$ multiplied by the probability that the true state is $O_j$ given the observation X.

The conditional loss formula may be further simplified if each orientation and language family is equally likely. In this situation the conditional loss may be formulated according to:

$$\text{Risk}(O_i | X) \propto \sum_{O_j = \{R0, J0, R90, J90...\}} \lambda(O_i | O_j) p(X | O_j).$$

In some embodiments of the present invention, the decision rule may be formulated as choosing the state that minimizes the overall loss according to:

$$MinLoss(O_i) = \min_{i = \{R0, J0, R90, J90,...\}}(\text{Risk}(O_i | X)).$$

In some embodiments of the present invention comprising two equally-likely language families, the matrix form of the conditional loss calculation may be formulated according to:

$$\begin{pmatrix} \text{Risk}(O_{R0}|X) \\ \text{Risk}(O_{J0}|X) \\ \text{Risk}(O_{R90}|X) \\ \text{Risk}(O_{J90}|X) \\ \text{Risk}(O_{R180}|X) \\ \text{Risk}(O_{J180}|X) \\ \text{Risk}(O_{R270}|X) \\ \text{Risk}(O_{J270}|X) \end{pmatrix} = \begin{pmatrix} \lambda(O_{R0}|O_{R0}) & \lambda(O_{R0}|O_{J0}) & \cdots & \lambda O_{R0}|O_{J270} \\ \lambda(O_{J0}|O_{R0}) & \lambda(O_{J0}|O_{J0}) & & \\ \vdots & & \ddots & \vdots \\ \lambda(O_{J270}|O_{R0}) & & & \lambda(O_{J270}|O_{J270}) \end{pmatrix} \cdot$$

$$\begin{pmatrix} p(X|O_{R0}) \\ p(X|O_{J0}) \\ p(X|O_{R90}) \\ p(X|O_{J90}) \\ p(X|O_{R180}) \\ p(X|O_{J180}) \\ p(X|O_{R270}) \\ p(X|O_{J270}) \end{pmatrix}$$

In some embodiments of the present invention wherein the feature vectors have known rotational properties (for example, the properties as described previously), the conditional loss may be formulated according to:

$$\begin{pmatrix} \text{Risk}(O_{R0}|X) \\ \text{Risk}(O_{J0}|X) \\ \text{Risk}(O_{R90}|X) \\ \text{Risk}(O_{J90}|X) \\ \text{Risk}(O_{R180}|X) \\ \text{Risk}(O_{J180}|X) \\ \text{Risk}(O_{R270}|X) \\ \text{Risk}(O_{J270}|X) \end{pmatrix} = \begin{pmatrix} \lambda(O_{R0}|O_{R0}) & \lambda(O_{R0}|O_{J0}) & \cdots & \lambda O_{R0}|O_{J270} \\ \lambda(O_{J0}|O_{R0}) & \lambda(O_{J0}|O_{J0}) & & \\ \vdots & & \ddots & \vdots \\ \lambda(O_{J270}|O_{R0}) & & & \lambda(O_{J270}|O_{J270}) \end{pmatrix} \cdot$$

$$\begin{pmatrix} p(X^{(0)}|O_R) \\ p(X^{(0)}|O_J) \\ p(X^{(90)}|O_R) \\ p(X^{(90)}|O_J) \\ p(X^{(180)}|O_R) \\ p(X^{(180)}|O_J) \\ p(X^{(270)}|O_R) \\ p(X^{(270)}|O_J) \end{pmatrix},$$

where the observation values may be permutated instead of using a separate model for each orientation and language family combination.

Some of the previously described embodiments of the present invention comprise classifiers comprising a joint orientation and language family decision. In alternative embodiments these decisions may be separated.

In some alternative embodiments, the language family may be determined, from N possible language families, $l1, \ldots, lN$, separately by minimizing the risk, where the risk may be determined according to:

$$\begin{pmatrix} \text{Risk}(L_{l1}|X) \\ \vdots \\ \text{Risk}(L_{lN}|X) \end{pmatrix} =$$

$$\begin{pmatrix} \lambda(L_{l1}|O_{l10}) & \cdots & \lambda(L_{l1}|O_{lN0}) & \cdots & \lambda(L_{l1}|O_{l1270}) & \cdots & \lambda(L_{l1}|O_{lN270}) \\ \lambda(L_{l2}|O_{l10}) & \cdots & \lambda(L_{l2}|O_{lN0}) & \cdots & \lambda(L_{l2}|O_{l1270}) & \cdots & \lambda(L_{l2}|O_{lN270}) \\ \vdots & & \vdots & & \vdots & & \vdots \\ \lambda(L_{lN}|O_{l10}) & \cdots & \lambda(L_{lN}|O_{lN0}) & \cdots & \lambda(L_{lN}|O_{l1270}) & \cdots & \lambda(L_{lN}|O_{lN270}) \end{pmatrix} p$$

where p is the vector of likelihood values, where p may be determined according to:

$$p = \begin{pmatrix} p(X|O_{l10}) \\ \vdots \\ p(X|O_{lN0}) \\ p(X|O_{l190}) \\ \vdots \\ p(X|O_{lN90}) \\ p(X|O_{l1180}) \\ \vdots \\ p(X|O_{lN180}) \\ p(X|O_{l1270}) \\ \vdots \\ p(X|O_{lN270}) \end{pmatrix} = \begin{pmatrix} p(X_0|L_{l1}) \\ \vdots \\ p(X_0|L_{lN}) \\ p(X_{90}|L_{l1}) \\ \vdots \\ p(X_{90}|L_{lN}) \\ p(X_{180}|L_{l1}) \\ \vdots \\ p(X_{180}|L_{lN}) \\ p(X_{270}|L_{l1}) \\ \vdots \\ p(X_{270}|L_{lN}) \end{pmatrix}$$

wherein the feature vectors have known rotational properties (for example, the properties as described previously).

In some alternative embodiments, the orientation may be determined separately by minimizing the risk, where the risk may be determined according to:

$$\begin{pmatrix} \text{Risk}(O_0|X) \\ \text{Risk}(O_{90}|X) \\ \text{Risk}(O_{180}|X) \\ \text{Risk}(O_{270}|X) \end{pmatrix} =$$

$$\begin{pmatrix} \lambda(O_0|O_{l10}) & \cdots & \lambda(O_0|O_{lN0}) & \cdots & \lambda(O_0|O_{l1270}) & \cdots & \lambda(O_0|O_{lN270}) \\ \lambda(O_{90}|O_{l10}) & \cdots & \lambda(O_{90}|O_{lN0}) & \cdots & \lambda(O_{90}|O_{l1270}) & \cdots & \lambda(O_{90}|O_{lN270}) \\ \lambda(O_{180}|O_{l10}) & \cdots & \lambda(O_{180}|O_{lN0}) & \cdots & \lambda(O_{120}|O_{l1270}) & \cdots & \lambda(O_{180}|O_{lN270}) \\ \lambda(O_{270}|O_{l10}) & \cdots & \lambda(O_{270}|O_{lN0}) & \cdots & \lambda(O_{270}|O_{l1270}) & \cdots & \lambda(O_{270}|O_{lN270}) \end{pmatrix} p$$

where p is the vector of likelihood values, where p may be determined according to:

$$p = \begin{pmatrix} p(X|O_{l10}) \\ \vdots \\ p(X|O_{lN0}) \\ p(X|O_{l190}) \\ \vdots \\ p(X|O_{lN90}) \\ p(X|O_{l1180}) \\ \vdots \\ p(X|O_{lN180}) \\ p(X|O_{l1270}) \\ \vdots \\ p(X|O_{lN270}) \end{pmatrix} = \begin{pmatrix} p(X_0|L_{l1}) \\ \vdots \\ p(X_0|L_{lN}) \\ p(X_{90}|L_{l1}) \\ \vdots \\ p(X_{90}|L_{lN}) \\ p(X_{180}|L_{l1}) \\ \vdots \\ p(X_{180}|L_{lN}) \\ p(X_{270}|L_{l1}) \\ \vdots \\ p(X_{270}|L_{lN}) \end{pmatrix}$$

wherein the feature vectors have known rotational properties (for example, the properties as described previously).

Some alternative embodiments of the present invention may comprise a first minimum-loss classifier which may determine the language or language family. These embodiments may comprise a second minimum-loss classifier which may determine the orientation given the language or language family, denoted L, according to:

$$\begin{pmatrix} \text{Risk}(O_0|X) \\ \text{Risk}(O_{90}|X) \\ \text{Risk}(O_{180}|X) \\ \text{Risk}(O_{270}|X) \end{pmatrix} = \begin{pmatrix} \lambda(O_0|O_{L0}) & \lambda(O_0|O_{L90}) & \lambda(O_0|O_{L180}) & \lambda(O_0|O_{L270}) \\ \lambda(O_{90}|O_{L0}) & \lambda(O_{90}|O_{L90}) & \lambda(O_{90}|O_{L180}) & \lambda(O_{90}|O_{L270}) \\ \lambda(O_{180}|O_{L0}) & \lambda(O_{180}|O_{L90}) & \lambda(O_{120}|O_{L180}) & \lambda(O_{180}|O_{L270}) \\ \lambda(O_{270}|O_{L0}) & \lambda(O_{270}|O_{L90}) & \lambda(O_{270}|O_{L180}) & \lambda(O_{270}|O_{L270}) \end{pmatrix} p_L$$

where $p_L$ is the vector of likelihood values, where $p_L$ may be determined according to:

$$p_L = \begin{bmatrix} p(X|O_{L0}) \\ p(X|O_{L90}) \\ p(X|O_{L180}) \\ p(X|O_{L270}) \end{bmatrix} = \begin{bmatrix} p(X_0|L_L) \\ p(X_{90}|L_L) \\ p(X_{180}|L_L) \\ p(X_{270}|L_L) \end{bmatrix}$$

wherein the feature vectors have known rotational properties (for example, the properties as described previously).

In some embodiments of the present invention comprising a minimum-loss classifier, a confidence value may be determined in association with the classifier decision. Exemplary confidence values may comprise the loss value associated with the minimum loss, the log loss value associated with the minimum loss, the difference between the minimum and maximum loss values, the difference between the minimum and maximum log loss values, the difference between the minimum loss value and the next smallest loss value, the difference between the minimum log loss value and the next smallest log loss value, and other measures of the spread between the current best decision and the alternative decisions.

In some embodiments of the present invention, a loss strategy may be selected such that the loss associated with selecting the correct orientation while missing the language family is smaller than the loss associated with selecting the wrong orientation while correctly identifying the language family.

In some embodiments of the present invention, a loss strategy may be selected such that the loss associated with selecting the readable orientation while the true orientation is a rotated orientation may be less than the loss associated with selecting a rotated orientation when the true orientation is the readable orientation.

Figure 16:
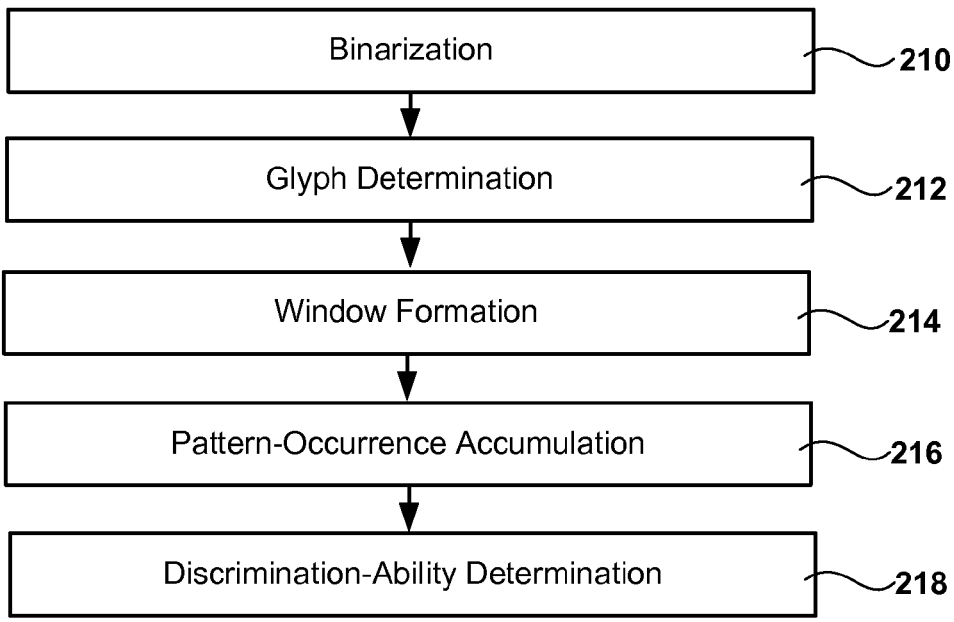
FIG. 16 is a chart showing embodiments of the present invention comprising a pattern feature based on a window centered on a glyph pixel.

In some embodiments of the present invention, an alternative feature space to the feature space based on binary corner patterns described above may be used in the probabilistic models as described above. In these embodiments, one or more most-discriminatory features may be determined for each language family using a training data set associated with each language family and orientation. For each language family, the most-discriminatory features may be determined according to FIG. 16. Each input image in the training set may be binarized 210 and the glyphs located 212. Following determination of the glyphs 212, a window of size m×m may be centered 214 at each glyph pixel, and a counter corresponding to the m×m pixel pattern associated with the centered glyph pixel may be incremented 216. In some embodiments of the present invention the window may be of size 5×5. The most-discriminatory features may be determined 218 from the accumulation data associated with the patterns.

In some embodiments, an m×m pixel pattern may be considered a most-discriminatory feature if the frequency-of-occurrence of the pixel pattern is greater than a frequency threshold. In some embodiments of the present invention, an m×m pixel pattern, which may be denoted $p_i$, may be considered a most-discriminatory feature if:

$$\frac{\text{count}(p_i)}{\text{count}(\text{glyphs})} > T_{count}.$$

In some embodiments of the present invention, only the top M pixel patterns meeting a most-discriminatory selection criterion may be considered. In alternative embodiments, any pixel pattern meeting a most-discriminatory selection criterion may be considered.

Figure 17:
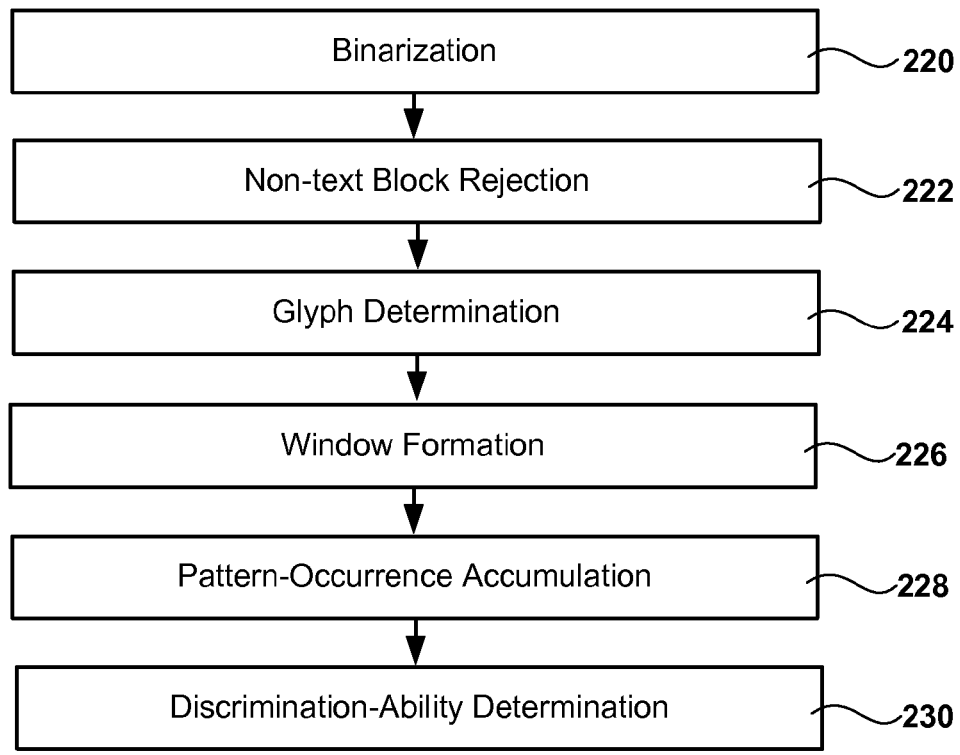
FIG. 17 is a chart showing embodiments of the present invention comprising non-text block rejection.

In some embodiments of the present invention described in relation to FIG. 17, non-text block rejection 222 may be performed after binarization 220 and prior to glyph determination 224 to eliminate non-text blocks. Window formation 226, pattern-occurrence accumulation 228 and discrimination-ability determination 230 may follow glyph determination 224.

Figure 18:
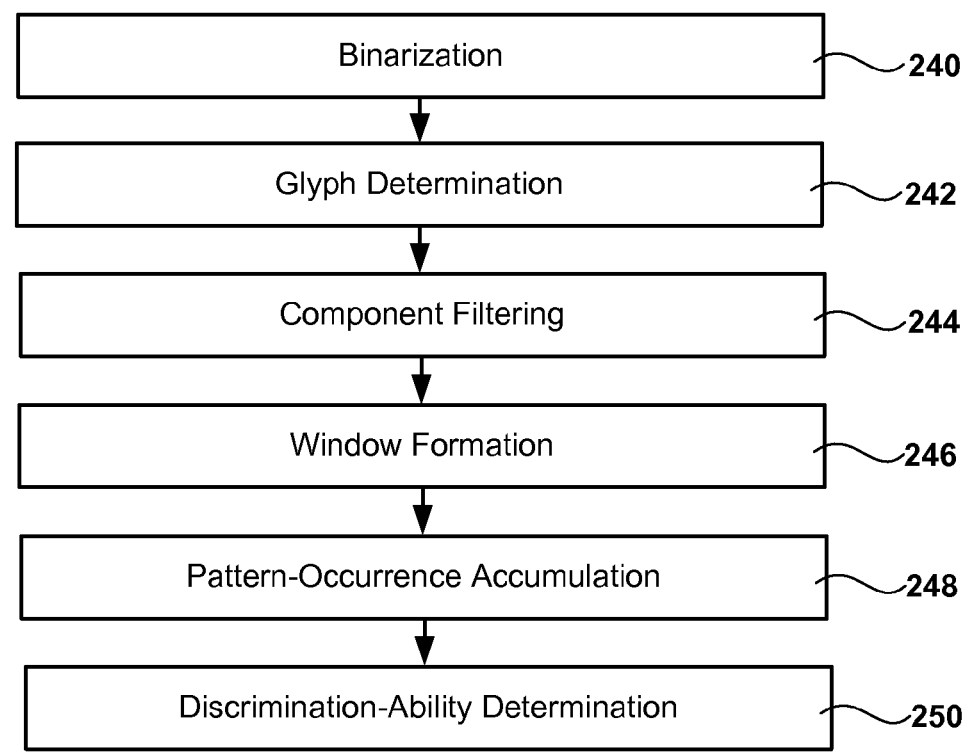
FIG. 18 is a chart showing embodiments of the present invention comprising component filtering.

In alternative embodiments of the present invention described in relation to FIG. 18, component filtering 244 may be performed after binarization 240 and glyph determination 242 to eliminate glyph components that may be noise. Window formation 246, pattern-occurrence accumulation 248 and discrimination-ability determination 250 may follow component filtering 244.

In yet alternative embodiments of the present invention, both non-text block rejection and component filtering may be performed.

In some embodiments of the present invention, a probabilistic classifier may be formed according to a MAP formulation using a combined set of the most-discriminatory features for the language families for which the classifier may be designed to distinguish. In alternative embodiments of the present invention, a probabilistic classifier may be formed according to an ML formulation using a combined set of the most-discriminatory features for the language families for which the classifier may be designed to distinguish. In still alternative embodiments of the present invention, a probabilistic classifier may be formed according to a minimum risk formulation using a combined set of the most-discriminatory features for the language families for which the classifier may be designed to distinguish. In some embodiments of the present invention, feature values for the combined feature set may be measure for an input image, thereby forming a feature vector, and the probabilistic classifier may be used to determine the language family. In alternative embodiments of the present invention, the orientation maybe determined. In still alternative embodiments of the present invention, the language family and the orientation may be determined.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining an image characteristic in a digital image, said method comprising:
    a) identifying a first glyph component in a digital image;
    b) determining a first reference location for said first glyph component;
    c) in said first glyph component, determining a first feature location associated with a first glyph feature;
    d) determining a first position, relative to said first reference location, of said first feature location;
    e) accumulating, in a first distribution counter, a frequency-of-occurrence count related to said first glyph feature and said first position;
    f) determining a distribution feature based on said first distribution counter; and
    g) associating a first image-characteristic value with said digital image based on said distribution feature and a first probabilistic model, wherein said first probabilistic model is associated with said first glyph feature and said first image characteristic.

2. A method according to claim 1 further comprising receiving a first plurality of parameters associated with said first probabilistic model.

3. A method according to claim 1, wherein said identifying comprises forming a binary image from said digital image.

4. A method according to claim 1 further comprising associating a second image-characteristic value with said digital image based on said distribution feature and a second probabilistic model, wherein said second probabilistic model is associated with said first glyph features and said second image characteristic.

5. A method according to claim 4, wherein:
    a) said first image characteristic is an orientation characteristic; and
    b) said second image characteristic is a language characteristic.

6. A method according to claim 4, wherein:
    a) said first probabilistic model and said second probabilistic model are a joint probabilistic model; and
    b) said associating a first image-characteristic value and said associating a second image-characteristic value is done jointly according to said joint probabilistic model.

7. A method according to claim 1, wherein said associating comprises permuting said distribution feature to correspond to a first orientation, wherein said first glyph component is associated with a second orientation that relates to said first orientation by a rotation.

8. A method according to claim 1, wherein said probabilistic model comprises a normal density function.

9. A method according to claim 1, wherein said associating comprises a classifier selected from the group consisting of a maximum a posteriori probability (MAP) classifier, a maximum likelihood (ML) classifier and a minimum-risk classifier.

10. A method according to claim 1, wherein said first reference location is the centroid of said first glyph component.

11. A method according to claim 1, wherein said determining a first reference location comprises:
    a) determining a bounding box for said first glyph component; and
    b) determining the center of said bounding box.

12. A method according to claim 1, wherein said determining a first position comprises a quadrant decomposition based on said first reference location.

13. A method according to claim 1, wherein said first image characteristic is a characteristic selected from the group consisting of an orientation characteristic and a language characteristic.

14. A method according to claim 1 further comprising determining a confidence level associated with said first image characteristic.

15. A method according to claim 1 further comprising:
    a) in said first glyph component, determining a second feature location associated with a second glyph feature;
    b) determining a second position, relative to said first reference location, of said second feature location; and
    c) accumulating, in said first distribution counter, a frequency-of-occurrence count related to said second glyph feature and said second position.

16. A method according to claim 1 further comprising:
    a) determining a second glyph component in said digital image;
    b) determining a second reference location for said second glyph component;
    c) in said second glyph component, determining a second feature location associated with said first glyph feature;
    d) determining a second position, relative to said second reference location, of said second feature location;
    e) accumulating, in a second distribution counter, a frequency-of-occurrence count related to said first glyph feature and said second position; and
    f) combining said second distribution counter and said first distribution counter to form said distribution feature.

17. A method for determining an image characteristic in a digital image, said method comprising:
    a) identifying a first plurality of glyph components in a digital image;
    b) for each glyph component in said first plurality of glyph components, determining a glyph-feature location-distribution counter, thereby producing a first plurality of distribution counters;
    c) determining a distribution feature based on said first plurality of distribution counters; and
    d) associating a first image-characteristic value with said digital image based on said distribution feature and a first probabilistic model, wherein said first probabilistic model is associated with a plurality of glyph features and said first image characteristic.

18. A method according to claim 17, wherein said associating comprises a classifier selected from the group consisting of a maximum a posteriori probability (MAP) classifier, a maximum likelihood (ML) classifier and a minimum-risk classifier.

19. A method according to claim 17, wherein said first image characteristic is a characteristic selected from the group consisting of an orientation characteristic and a language characteristic.

20. A method according to claim 17, wherein said identifying a first plurality of glyph components comprises determining likely text glyph components from a first plurality of connected components.

21. A method according to claim 17, wherein said identifying a first plurality of glyph components comprises filtering a second plurality of glyph components to eliminate noise.

22. A method for determining an image characteristic in a digital image, said method comprising:
  a) identifying a first glyph component in a digital image;
  b) identifying a first pattern associated with a first glyph pixel within said first glyph component, wherein said first pattern is based on said first glyph pixel and a first plurality of pixels within a neighborhood proximate to said first glyph pixel;
  c) accumulating, in a first distribution counter, a frequency-of-occurrence count related to said first pattern;
  d) determining a distribution feature based on said first distribution counter; and
  e) associating a first image-characteristic value with said digital image based on said distribution feature and a first probabilistic model, wherein said first probabilistic model is associated with said first pattern and said first image characteristic.

23. A method according to claim 22, wherein said first image characteristic is a characteristic selected from the group consisting of an orientation characteristic and a language characteristic.

* * * * *

UNITED STATES PATENT AND TRADEMARK OFFICE
CERTIFICATE OF CORRECTION

| | | |
|---|---|---|
| PATENT NO. | : 8,160,365 B2 | |
| APPLICATION NO. | : 12/164985 | |
| DATED | : April 17, 2012 | |
| INVENTOR(S) | : Richard John Campbell et al. | |

It is certified that error appears in the above-identified patent and that said Letters Patent is hereby corrected as shown below:

Column 7, Line 1 should read:

lower-left quadrant if 37 $(fx - c_x) \leq 0$ and $(fy - c_y) \geq 0$;

Column 23, Lines 35-38 should read:

$$\begin{pmatrix} \lambda(O_0 \mid O_{L0}) & \lambda(O_0 \mid O_{L90}) & \lambda(O_0 \mid O_{L180}) & \lambda(O_0 \mid O_{L270}) \\ \lambda(O_{90} \mid O_{L0}) & \lambda(O_{90} \mid O_{L90}) & \lambda(O_{90} \mid O_{L180}) & \lambda(O_{90} \mid O_{L270}) \\ \lambda(O_{180} \mid O_{L0}) & \lambda(O_{180} \mid O_{L90}) & \lambda(O_{180} \mid O_{L180}) & \lambda(O_{180} \mid O_{L270}) \\ \lambda(O_{270} \mid O_{L0}) & \lambda(O_{270} \mid O_{L90}) & \lambda(O_{270} \mid O_{L180}) & \lambda(O_{270} \mid O_{L270}) \end{pmatrix} \mathbf{p}^{\lambda}$$

Signed and Sealed this
Twenty-ninth Day of January, 2013

David J. Kappos
*Director of the United States Patent and Trademark Office*